United States Patent
Kajimura

(10) Patent No.: US 9,906,726 B2
(45) Date of Patent: Feb. 27, 2018

(54) IMAGE STABILIZATION CONTROL APPARATUS, OPTICAL APPARATUS AND STORAGE MEDIUM STORING IMAGE STABILIZING CONTROL PROGRAM

(71) Applicant: CANON KABUSHIKI KAISHA, Tokyo (JP)

(72) Inventor: Fumihiro Kajimura, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 22 days.

(21) Appl. No.: 15/134,636

(22) Filed: Apr. 21, 2016

(65) Prior Publication Data

US 2016/0316146 A1 Oct. 27, 2016

(30) Foreign Application Priority Data

Apr. 22, 2015 (JP) .................................. 2015-087848
Apr. 1, 2016 (JP) .................................. 2016-074495

(51) Int. Cl.
*H04N 5/228* (2006.01)
*H04N 5/232* (2006.01)

(52) U.S. Cl.
CPC ..... *H04N 5/23287* (2013.01); *H04N 5/23254* (2013.01); *H04N 5/23258* (2013.01)

(58) Field of Classification Search
CPC ........... H04N 5/23254; H04N 5/23258; H04N 5/23287; H04N 5/23251; G03B 2217/005
See application file for complete search history.

(56) References Cited

U.S. PATENT DOCUMENTS

| 6,734,902 B1* | 5/2004 | Kawahara | G03B 5/00 348/208.5 |
| 2009/0316010 A1* | 12/2009 | Nomura | G03B 5/00 348/208.6 |
| 2012/0033954 A1* | 2/2012 | Wakamatsu | G02B 27/646 396/55 |
| 2014/0152877 A1* | 6/2014 | Honsho | G03B 15/00 348/239 |

(Continued)

FOREIGN PATENT DOCUMENTS

JP 05-122590 A 5/1993

*Primary Examiner* — Lin Ye
*Assistant Examiner* — John H Morehead, III
(74) *Attorney, Agent, or Firm* — Cowan, Liebowitz & Latman, P.C.

(57) ABSTRACT

The image stabilization control apparatus includes a shake extracting unit extracting a first shake signal whose frequency is higher than a predetermined frequency from a shake detection signal, a predicting unit producing, by using a motion vector detection signal, a predicted shake signal indicating a predicted value of shaking of an optical apparatus, a combining unit combining the first shake signal with the predicted shake signal to produce a second shake signal, a controlling unit performing an image stabilization control using the second shake signal, and a motion vector extracting unit extracting a specific motion vector signal whose frequency is lower than the predetermined frequency from the motion vector detection signal. The controlling unit performs the image stabilization control using the second shake signal in still image capturing, and the predicting unit produces the predicted shake signal by using the specific motion vector signal.

15 Claims, 11 Drawing Sheets

(56) References Cited

U.S. PATENT DOCUMENTS

| | | | |
|---|---|---|---|
| 2014/0204228 A1* | 7/2014 | Yokokawa ......... | H04N 5/23267 348/208.6 |
| 2015/0365598 A1* | 12/2015 | Tanaka ............... | H04N 5/23258 348/208.2 |
| 2017/0163895 A1* | 6/2017 | Ryu ................... | H04N 5/23267 |

* cited by examiner

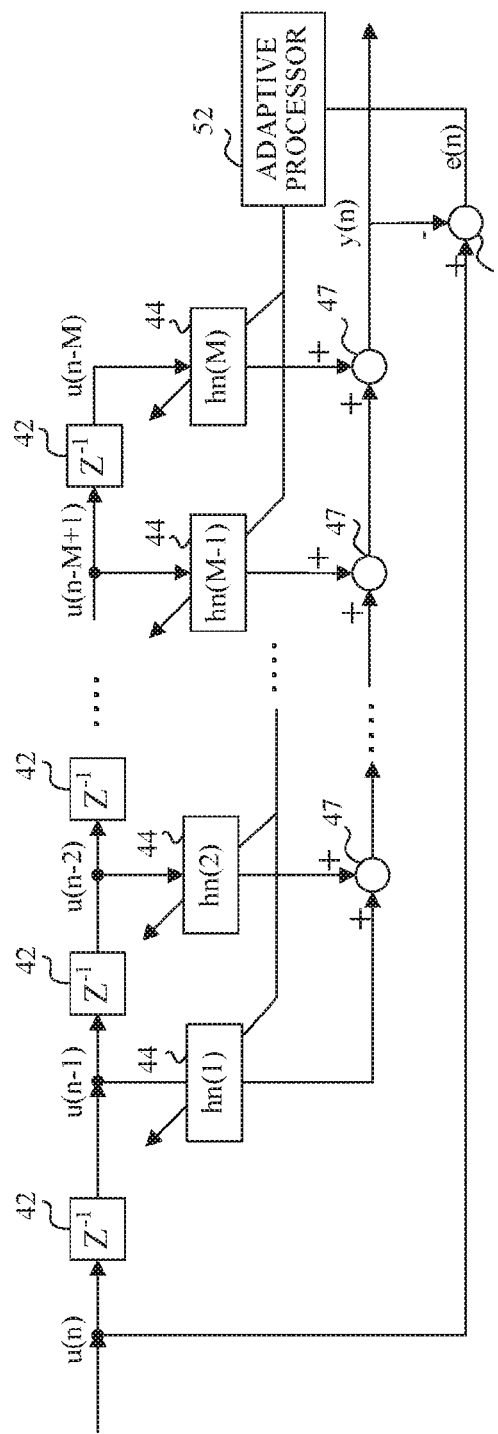
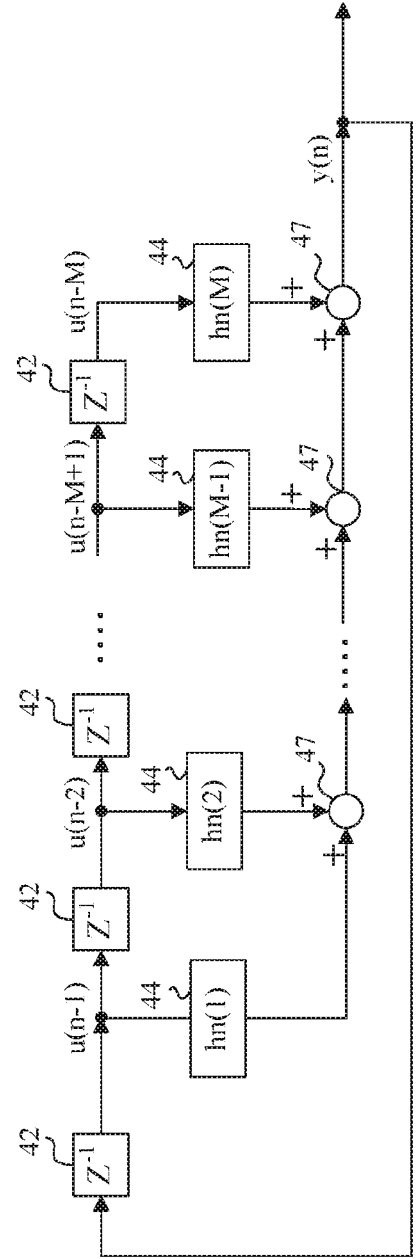
FIG. 6A
FIG. 6B

IMAGE STABILIZATION CONTROL APPARATUS, OPTICAL APPARATUS AND STORAGE MEDIUM STORING IMAGE STABILIZING CONTROL PROGRAM

BACKGROUND OF THE INVENTION

Field of the Invention

The present invention relates to an image stabilization apparatus capable of reducing image blur in optical apparatus such as digital cameras and interchangeable lenses.

Description of the Related Art

An optical image stabilization, which is an image stabilization technique to correct (reduce), in still image capturing with a digital camera, image blur due to shaking of the camera caused by user's hand jiggling, is proposed that moves (shifts) a lens or an image sensor (such as a CMOS sensor) with respect to an image capturing optical apparatus. The shaking of the camera (camera shake) is detected by using a shake sensor such as an angular velocity sensor (gyro sensor) or by calculating a motion vector between frame images constituting a captured motion image as disclosed in Japanese Patent Laid-Open No. 05-122590.

However, use of the shake sensor has a problem that a low frequency noise (error component), called a drift, overlaps a sensor output corresponding to an actual camera shake, which may deteriorate a detection accuracy for the camera shake and thus result in an insufficient image stabilization control. On the other hand, use of the motion vector enables accurately detecting the camera shake. However, the motion vector cannot be detected in an image sensor exposure time for still image capturing, which disables an image stabilization control using the motion vector.

SUMMARY OF THE INVENTION

The present invention provides an image stabilization control apparatus and an optical apparatus provided therewith capable of performing a good image stabilization control using a shake sensor in still image capturing in which a motion vector cannot be obtained.

The present invention provides as an aspect thereof an image stabilization control apparatus configured to perform an image stabilization control to reduce image blur due to shaking of the optical apparatus by using a shake detection signal obtained through detection of the shaking of the optical apparatus and a motion vector detection signal indicating a motion vector detected in an image signal produced through image capturing using the optical apparatus. The image stabilization control apparatus includes a shake extracting unit configured to extract a first shake signal from the shake detection signal, the first shake signal being a frequency component whose frequency is higher than a predetermined frequency, a predicting unit configured to produce, by using the motion vector detection signal, a predicted shake signal indicating a predicted value of the shaking, a combining unit configured to combine the first shake signal with the predicted shake signal to produce a second shake signal, a controlling unit configured to perform the image stabilization control by using the second shake signal, and a motion vector extracting unit configured to extract a specific motion vector signal from the motion vector detection signal, the specific motion vector signal being a frequency component whose frequency is lower than the predetermined frequency. The controlling unit is configured to perform the image stabilization control by using the second shake signal in still image capturing, and the predicting unit is configured to produce the predicted shake signal by using the specific motion vector signal.

The present invention provides as another aspect thereof an image stabilization control apparatus configured to perform an image stabilization control to reduce image blur due to shaking of the optical apparatus by using a shake detection signal obtained through detection of the shaking of the optical apparatus and a motion vector detection signal indicating a motion vector detected in an image signal produced through image capturing using the optical apparatus and an image sensor. The image stabilization control apparatus includes a shake extracting unit configured to extract a first shake signal from the shake detection signal, the first shake signal being a frequency component whose frequency is higher than a predetermined frequency, a predicting unit configured to produce, by using the motion vector detection signal, a predicted shake signal indicating a predicted value of the shaking, a combining unit configured to combine the first shake signal with the predicted shake signal to produce a second shake signal, a controlling unit configured to perform the image stabilization control by using the second shake signal, and a frequency changing unit configured to change the predetermined frequency depending on at least one of a length of an elapsed exposure time of the image sensor in the image capturing and a length of an exposure time of the image sensor for the image capturing.

The present invention provides as still another aspect thereof an optical apparatus including any one of the above image stabilization control apparatuses, and an optical image stabilizing element configured to be driven by the image stabilization control.

The present invention provides as yet another aspect thereof a non-transitory computer-readable storage medium storing an image stabilizing control program as a computer program to cause a computer to perform an image stabilization control process to reduce image blur due to shaking of an optical apparatus by using a shake detection signal obtained through detection of the shaking of the optical apparatus and a motion vector detection signal indicating a motion vector detected in an image signal produced through image capturing using the optical apparatus. The image stabilization control process includes extracting a first shake signal from the shake detection signal, the first shake signal being a frequency component whose frequency is higher than a predetermined frequency, producing, by using the motion vector detection signal, a predicted shake signal indicating a predicted value of the shaking, combining the first shake signal with the predicted shake signal to produce a second shake signal, performing the image stabilization control by using the second shake signal, and extracting a specific motion vector signal from the motion vector detection signal, the specific motion vector signal being a frequency component whose frequency is lower than the predetermined frequency. The program causes the computer to perform the image stabilization control process by using the second shake signal in still image capturing and to produce the predicted shake signal by using the specific motion vector signal.

The present invention provides as further another aspect thereof a non-transitory computer-readable storage medium storing an image stabilizing control program as a computer program to cause a computer to perform an image stabilization control process to reduce image blur due to shaking of an optical apparatus by using a shake detection signal obtained through detection of the shaking of the optical apparatus and a motion vector detection signal indicating a motion vector detected in an image signal produced through image capturing using the optical apparatus and an image sensor. The image stabilization control process includes extracting a first shake signal from the shake detection signal, the first shake signal being a frequency component whose frequency is higher than a predetermined frequency, producing, by using the motion vector detection signal, a predicted shake signal indicating a predicted value of the shaking, combining the first shake signal with the predicted shake signal to produce a second shake signal, performing the image stabilization control by using the second shake signal, and changing the predetermined frequency depending on at least one of a length of an elapsed exposure time of the image sensor in the image capturing and a length of an exposure time of the image sensor for the image capturing.

Further features and aspects of the present invention will become apparent from the following description of exemplary embodiments with reference to the attached drawings.

BRIEF DESCRIPTION OF THE DRAWINGS

FIGS. 6A and 6B are block diagrams illustrating a prediction process using an adaptive algorithm performed by the shake predicting unit in Embodiment 1.

DESCRIPTION OF THE EMBODIMENTS

Exemplary embodiments of the present invention will hereinafter be described with reference to the accompanying drawings.

Embodiment 1

Figure 2:
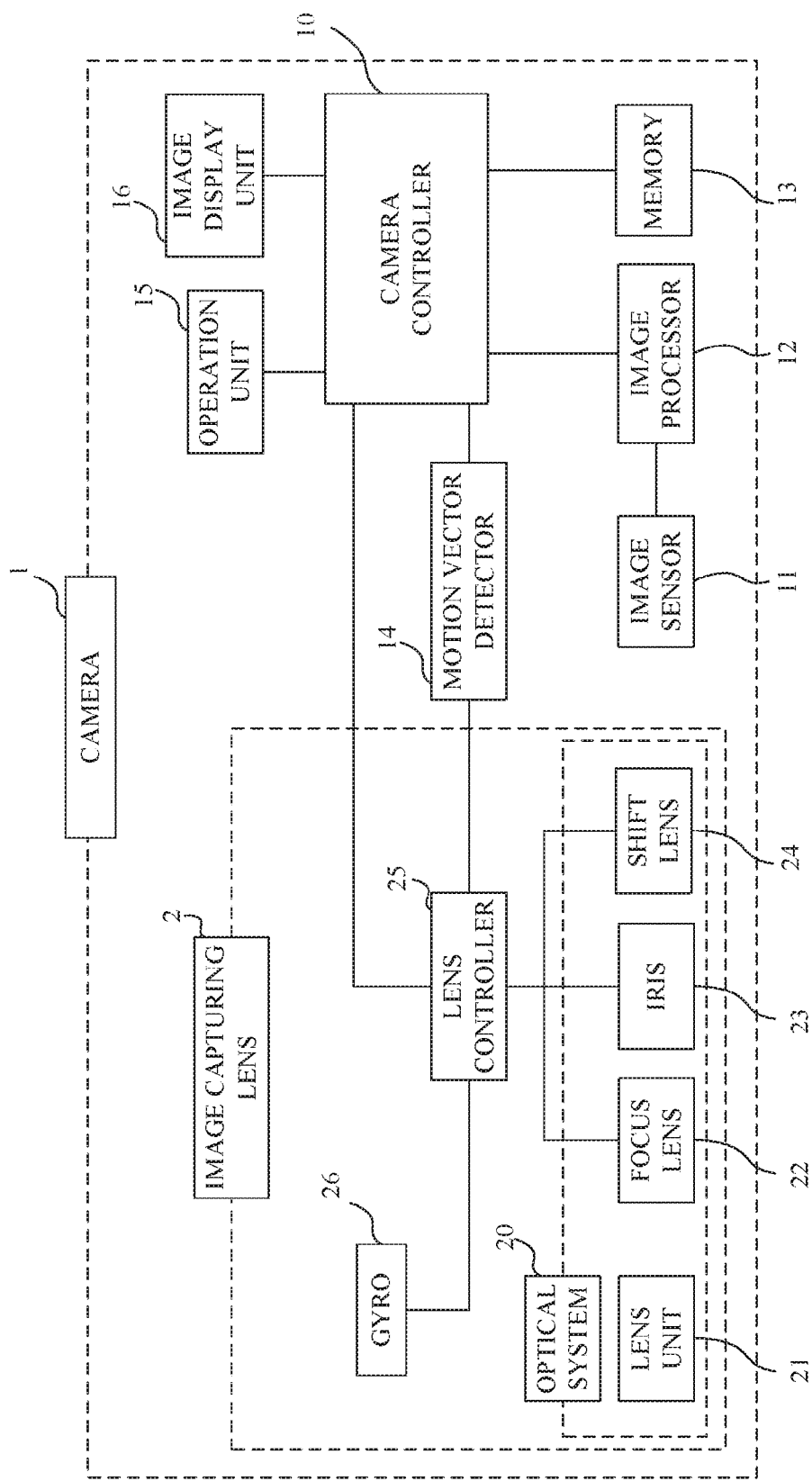
FIG. 2 is a block diagram illustrating a configuration of an image capturing apparatus provided with the image stabilization control apparatus of Embodiment 1.

FIG. 2 illustrates a configuration of a digital camera 1 as an image capturing apparatus (optical apparatus) provided with an image stabilization control apparatus that is a first embodiment (Embodiment 1) of the present invention. The camera 1 as a lens-integrated camera includes an image capturing lens 2, an image sensor 11 that photoelectrically converts (that is, captures) an optical image formed by an image capturing optical system 20 provided in the image capturing lens 2, and an image processor 12 that produces, using an image capturing signal output from the image sensor 11, a video (moving image) signal and a still image signal.

The camera 1 further includes a memory 13 described later, a motion vector detector (motion vector detecting unit) 14 that detects a motion vector from the video signal, an operation unit 15 that detects user's operations, an image displaying unit 16 that displays the image signals, and a camera controller (camera control unit) 10 that governs controls of the entire camera 1 including the image capturing lens 2.

The motion vector detector 14 detects, between two consecutive frame images constituting the video signal, a motion vector indicating a distance (amount of displacement) and a direction between corresponding points and outputs a motion vector detection signal indicating the detected results.

The image capturing optical system 20 in the image capturing lens 2 includes a lens unit 21 constituted by a magnification-varying lens and others, a focus lens 22 that performs focusing, and an iris aperture stop 23 that controls a light amount. The image capturing optical system 20 further includes a shift lens 24 as an optical image stabilizing element that moves (shifts) with respect to an optical axis (image capturing optical axis) of the image capturing optical system 20 in directions orthogonal to the image capturing optical axis to correct (reduce) image blur due to a camera shake described later. The shift lens 24 in FIG. 2 includes a shift lens, a shift actuator that shifts the shift lens in the directions orthogonal to the optical axis, and a driver that drives the shift actuator.

The image capturing lens 2 further includes a gyro sensor 26 as a shake sensor (shake detecting unit) that detects shaking of the camera 1 (in other words, the camera shake) due to user's hand jiggling, and a lens controller (lens controlling unit) 25 that controls drives of the focus lens 22, the iris aperture stop 23 and the shift lens 24. The gyro sensor 26 outputs an angular velocity signal indicating an angular velocity of the camera shake.

The lens controller 25 controls, through communication with the camera controller 10, the drives of the focus lens 22 and the iris aperture stop 23 to perform AF (auto focus) and AE (auto exposure). The lens controller 25 further includes an image stabilization controller that performs an image stabilization control to control the drive of the shift actuator, that is, the drive (shift drive) of the shift lens 24, by using the motion vector detection signal from the motion vector detector 14 and the angular velocity signal from the gyro sensor 26. The image stabilization controller corresponds to the image stabilization control apparatus.

The image capturing signal (analog signal) output from the image sensor 11 photoelectrically converting the optical image (object image) formed by the image capturing optical system 20 is converted into a digital signal by an A/D converter (not illustrated) provided in the image processor 12. The image processor 12 performs, in response to process commands from the camera controller 10, various image processes such as a white balance process, a gamma process and a pixel interpolation process on the digital signal to produce the image signals (video and still image signals). The memory 13 records the image signals produced by the image processor 12 to a recording medium such as a semiconductor memory.

The camera controller 10 is constituted as a computer including a CPU and an internal memory. The camera controller 10 outputs timing signals and various commands to respective units in the camera 1 and the lens controller 25. The camera controller 10 further controls an image capturing preparation operation including the AF and AE, in response to a first release signal SW1 as an image capturing preparation instruction generated by a half-press operation of a release switch included in the operation unit 15. The camera controller 10 further controls a still image capturing operation including production and recording of a still image, in response to an input of a second release signal SW2 as a still image capturing instruction generated by a full-press operation of the release switch.

Next, with referring to FIG. 3, schematic description will be made of the image stabilization control performed in the still image capturing. In a graph illustrated in an upper part of FIG. 3, a horizontal axis indicates time, and a vertical axis indicates camera shake amounts. A bold solid line 31 illustrates the motion vector detection signal from the motion vector detector 14; the motion vector detection signal is corrected such that its signal value corresponds to an actual camera shake amount irrespective of a focal length of the image capturing optical system 20 (that is, a size of the object image on the image sensor 11) and others.

A thin solid line 32 illustrates a shake detection signal produced by integration of the angular velocity signal from the gyro sensor 26. This shake detection signal is hereinafter referred to as "a gyro shake detection signal". The gyro shake detection signal in the figure is produced so as to correspond to the same camera shake amount as that to which the motion vector detection signal corresponds. A dashed-dotted line 33 indicates an error component (hereinafter referred to also as "a drift component") corresponding to a drift (noise) generated in the gyro sensor 26 and included in the gyro shake detection signal 32. That is, the gyro shake detection signal 32 includes the drift component overlapping a shake detection signal corresponding to the actual camera shake amount.

A dashed line 34 illustrates a predicted shake signal that indicates a predicted value of the motion vector calculated by a prediction process described later from the motion vector detection signal 31. The predicted shake signal 34 is used, together with the gyro shake detection signal, in the image stabilization process performed during an exposure of the image sensor 11 for the still image capturing (the exposure is hereinafter referred to as "a still image exposure").

Figure 3:
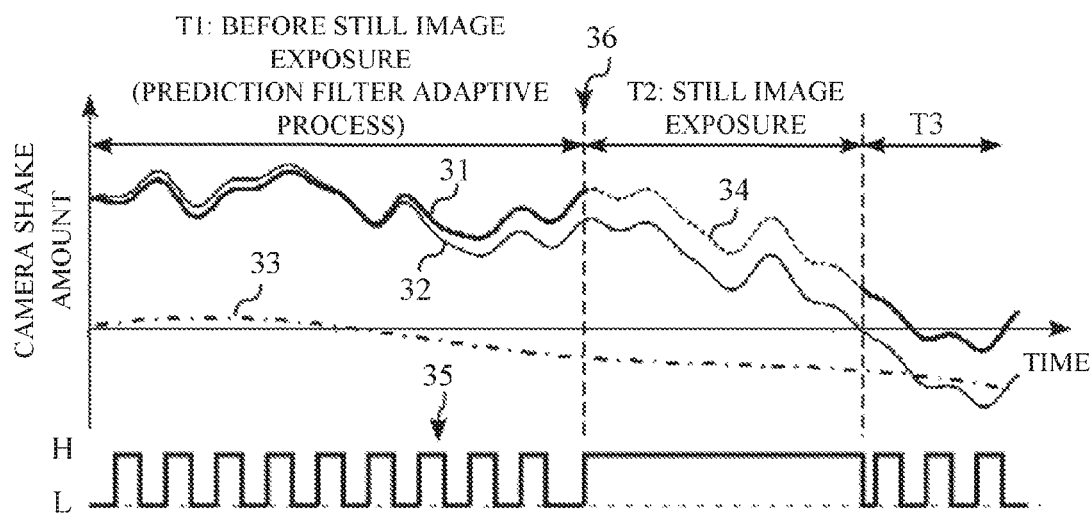
FIG. 3 illustrates a shake signal in Embodiment 1.

Furthermore, a time chart 35 illustrated in a lower part of FIG. 3 indicates times at which the still image exposures of the image sensor 11 are performed; H indicates a time period of the still image exposure, and L indicates a non-exposure time period. A time period T1 is an image capturing preparation period before the still image capturing, during which multiple short time exposures are repeated at equal intervals to produce the frame images.

Between each pair of frame images mutually temporally adjacent among the produced frame images, the motion vector is detected by the motion vector detector 14, and a prediction filter used for producing the predicted shake signal 34 is sequentially produced (updated) on a basis of the detected motion vector. The prediction filter will be described later.

A cycle of the short time exposure in the time period T1 is set to, for example, 120 FPS or 240 FPS. In the time period T1, the first release signal SW1 generated in response to the user's operation of the release switch in the operation unit 15 starts the image capturing preparation operation.

In a time period T2 starting from a time 36 in response to generation of the second release signal SW2 the user's operation in the operation unit 15, the still image exposure of the image sensor 11 is performed. In the time period T2, one exposure is continuously performed, so that the motion vector cannot be obtained.

A time period T3 is a period after a completion of the still image exposure, during which short time exposures of the image sensor 11 are cyclically repeated as during the time period T1.

In FIG. 3, the motion vector detection signal 31 calculates the motion vector from the video signal produced through the image capturing, so that a magnification of the motion vector approximately coincides with the actual camera shake amount. On the other hand, the gyro shake detection signal 32 including the drift component 33 as described above differs from the motion vector detection signal 31.

Thus, in this embodiment, the image stabilization controller of the lens controller 25 produces (updates) the prediction filter used to predict a motion vector in the time period T2 subsequent to the time period T1, by using a low frequency component (that is, a specific motion vector signal described later) of the motion vector detection signal in the time period T1. Since the magnification of the motion vector approximately coincides with the actual camera shake amount as described above, the predicted value of the motion vector is equivalent to a predicted value of the camera shake amount. Therefore, this embodiment refers to the signal indicating the predicted value of the motion vector as "a predicted shake signal". In response to the input of the second release signal SW2 at the time 36, the image stabilization controller performs the prediction process using the prediction filter to predict the predicted shake signal 34 in the time period T2 during which the still image exposure is performed.

Thereafter, in the time period T2, the image stabilization controller combines the predicted shake signal as a low frequency component with a high frequency component (first shake signal) of the gyro shake detection signal, in other words, adds together these frequency components to produce a shake signal (second shake signal; hereinafter referred to as "a combined shake signal") used for the image stabilization control. The image stabilization controller thus obtaining the combined shake signal performs the image stabilization control using that combined shake signal.

As described above, in the still image capturing, using the combined shake signal in which the low frequency component including the drift component generated in the gyro sensor 26 is not included enables performing a good (highly accurate) image stabilization control without being affected by the drift component.

Figure 1:
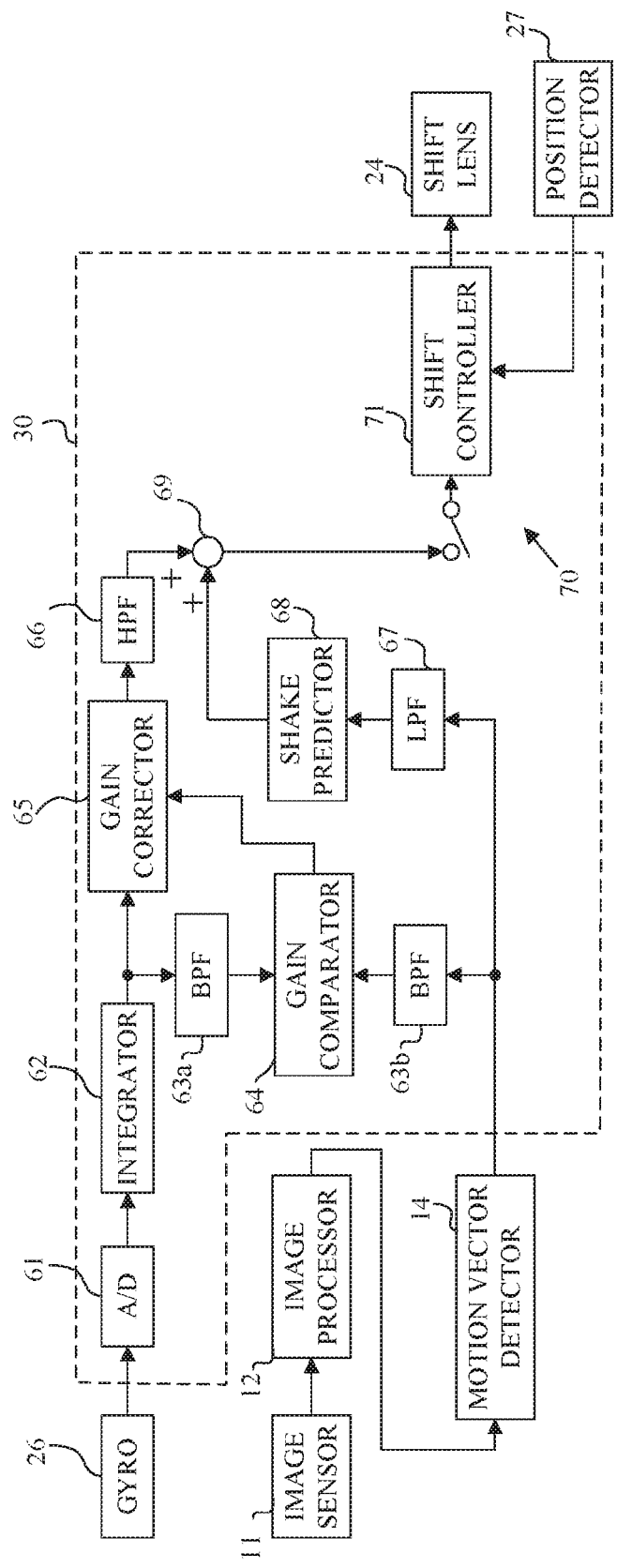
FIG. 1 is a block diagram illustrating a configuration of an image stabilization control apparatus that is Embodiment 1 of the present invention.

Next, with referring to FIG. 1, description will be made of a configuration and operations of the image stabilization controller 30 provided in the lens controller 25. In FIG. 1, components identical to those in FIG. 2 are denoted by the same reference numerals as those in FIG. 2.

In the image stabilization controller 30, reference numeral 61 denotes an analog-to-digital (A/D) converter that quantizes an analog angular velocity signal from the gyro sensor 26. A sampling frequency of the A/D converter 61 is set equal to a frame rate of the video signal used in the motion vector detector 14 (that is, a sampling frequency of the image sensor 11). Reference numeral 62 is an integrator that integrates a digital angular velocity signal converted by the A/D converter 61 to produce the gyro shake detection signal as an angular displacement signal.

Reference numerals 63a and 63b denote band-pass filters (BPFs) respectively extract, from the gyro shake detection signal produced by the integrator 62 and from the motion vector detection signal produced by the motion vector detector 14, signals in a predetermined frequency band. Reference numeral 64 denotes a gain comparator that compares a gain (amplitude) of the extracted gyro shake detection signal from the BPF 63a with a gain of the extracted motion vector detection signal from the BPF 63b. Reference numeral 65 denotes a gain corrector that corrects, depending on a caparison result of the gains obtained from the gain comparator 64, the gain of the gyro shake detection signal from the integrator 62.

The gyro shake detection signal indicates the angular velocity, and on the other hand, the motion vector detection signal indicates the displacement of the object image on the image sensor 11. Therefore, with respect to an identical camera shake, the camera shake amount indicated by the gyro shake detection signal differs from that indicated by the motion vector detection signal, depending on the focal length of the image capturing optical system 20 and on an object distance. Thus, the gain comparator 64 compares the gyro shake detection signal and the motion vector detection signal with each other, in respective ones of which a high frequency shake component hardly generated by the hand jiggling and an extremely low frequency component including the drift component have been cut by the BPFs 63a and 63b. Then, the gain corrector 65 corrects the gain of the gyro shake detection signal depending on the caparison result of the gains such that the corrected gain becomes to a level equivalent to that of the gain of the motion vector detection signal.

Reference numeral 66 denotes a high-pass filter (HFP) that is a shake extracting unit. The HPF 66 causes, of the gyro shake detection signal corrected by the gain corrector 65, the above-mentioned high frequency component as the first shake signal whose frequency is higher than a cut-off frequency as a predetermined frequency to pass therethrough to extract the high frequency component. The extracted high frequency component is hereinafter referred to as "a high frequency gyro shake signal".

Reference numeral 67 denotes a low-pass filter (LPF) that is a motion vector extracting unit. The LPF 67 causes, of the motion vector detection signal from the motion vector detector 14, the above-mentioned specific motion vector signal that is a frequency component whose frequency is lower than the above cut-off frequency to pass therethrough to extract the specific motion vector. The specific motion vector signal is hereinafter referred to as "a low frequency motion vector signal".

Reference numeral 68 denotes a shake predictor (predicting unit). The shake predictor 68 produces (updates) the prediction filter used in the prediction process, by using the low frequency motion vector signal having passed through the LPF 67 before the still image exposure. Specifically, the shake predictor 68 performs an adaptive process (or an adaptive operation) to sequentially update filter coefficients of the prediction filter. Then, the shake predictor 68 performs, during the still image exposure, the prediction process using the prediction filter to calculate the predicted shake signal.

Reference numeral 69 denotes an adder (combining unit) that adds together the high frequency gyro shake signal having passed through the HPF 66 and the predicted shake signal (low frequency component) from the shake predictor 68 to produce the combined shake signal. Reference numeral 70 denotes an output changeover switch that turns off before the still image exposure and turns on during the still image exposure to send the combined shake signal from the adder 69 to a shift controller 71. The execution and non-execution of the prediction process to predict the predicted shake signal by the shake predictor 68 and the turning on and off of the output changeover switch 70 are controlled in response to commands from the camera controller 10 illustrated in FIG. 2.

The shift controller 71 as a controlling unit drives the shift lens 24 to a target shift position (in other words, by a target shift drive amount) corresponding to the combined shake signal input from the output changeover switch 70. A shift position of the shift lens 24 is detected by a position detector 27. The detection result of the shift position (hereinafter referred to as "a detected shift position") from the position detector 27 is fed back to the shift controller 71. The shift controller 71 performs a feedback control of the shift drive of the shift lens 24 such that the detected shift position coincides with the target shift position.

Figure 4:
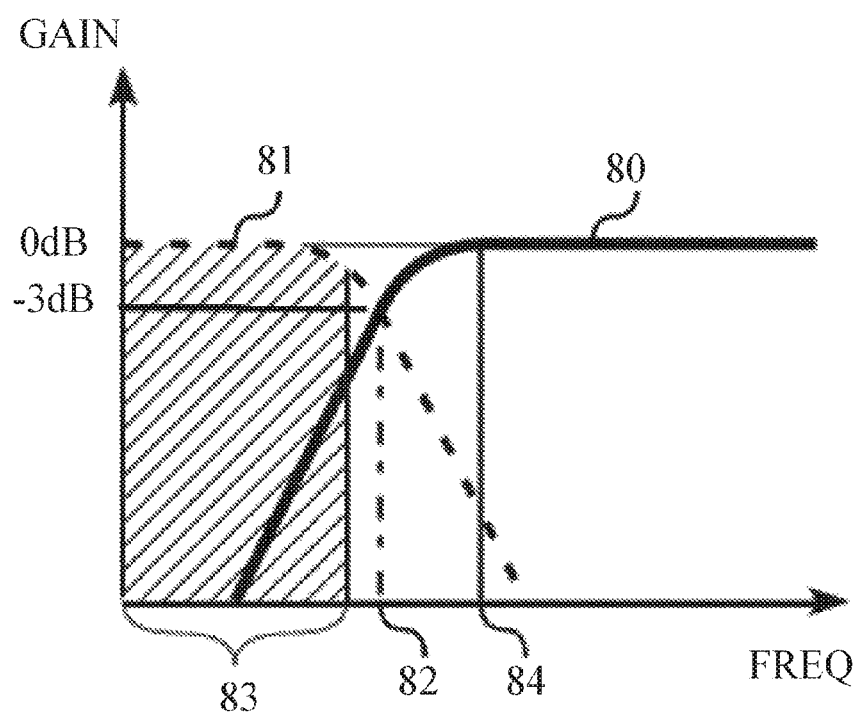
FIG. 4 is a frequency characteristic chart illustrating a cut-off frequency of a filter in Embodiment 1.

This embodiment provides the same cut-off frequency to the HPF 66 and LPF 67. FIG. 4 illustrates the cut-off frequency to the HPF 66 and LPF 67 and frequency characteristics of the HPF 66 and LPF 67. FIG. 4 further illustrates a frequency of the drift component included in the gyro shake detection signal. In FIG. 4, a horizontal axis indicates frequencies, and a vertical axis indicates gains of respective frequency components. A bold solid line 80 illustrates the frequency characteristic of the HPF 66, and a dashed line 81 illustrates the frequency characteristic of the LPF 67. A dashed-dotted line 82 illustrates the cut-off frequency fc of the HPF 66 and LPF 67. A hatched area 83 illustrates a frequency range of the drift component.

Although the gyro shake detection signal includes the drift component in the frequency range 83, most of the drift component is cut off by the HPF 66 whose cut-off frequency 82 is higher than a maximum frequency of the frequency range 83. That is, the high frequency gyro shake signal having passed through the HPF 66 includes almost no drift component. On the other hand, of the predicted shake signal produced using the motion vector detection signal from the motion vector detector 14, a high frequency component whose frequency is higher than the cut-off frequency 82 of the LPF 67 is cut off by this LPF 67.

The combined shake signal obtained by adding together the high frequency gyro shake signal and the predicted shake signal as the low frequency signal that have thus respectively passed through the HPF 66 and the LPF 67 does not include the drift component and has a gain characteristic flat over the entire frequency range. Using such a combined shake signal enables performing a well-controllable image stabilization control without being affected by the drift component.

Figure 5:
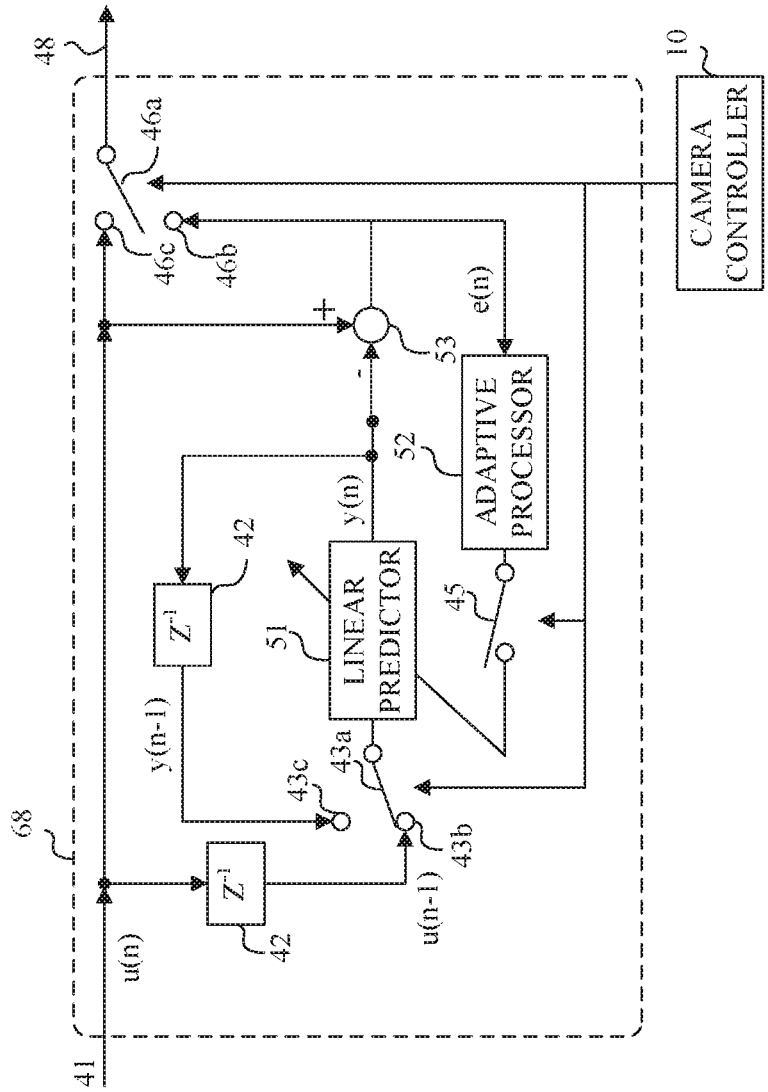
FIG. 5 is a block diagram illustrating a configuration of a shake predicting unit in Embodiment 1.

Next, with referring to FIG. 5, description will be made of a configuration and operations of the shake predictor 68. In FIG. 5, reference numeral 51 denotes a linear predictor as the prediction filter, 52 an adaptive processor, 53 a subtractor, 42 two unit delayers, 43a a prediction input changeover switch, and 43b and 43c contact points of the prediction input changeover switch 43a. Reference numeral 45 denotes an adaptive process switch, 46a an output changeover switch, and 46b and 46c contact points of the output changeover switch 46a. The input changeover switch 43a, the output changeover switch 46a, and the adaptive process switch 45 are switched in response to commands from the camera controller 10. Reference numeral 41 denotes an input terminal through which the motion vector detection signal from the motion vector detector 14 illustrated in FIG. 1 is input to the shake predictor 68. Reference numeral 48 denotes an output terminal through which the predicted shake signal from the shake predictor 68 is output to the adder 69 illustrated in FIG. 1.

Furthermore, u(n) represents the motion vector detection signal (hereinafter referred to also as "an observed value") input from the motion vector detector 14 to the input terminal 41, and y(n) represents the predicted shake signal (hereinafter referred to also as "a predicted value") from the linear predictor 51. Moreover, e(n) represents an error generated in a linear prediction in the prediction process performed by the linear predictor 51. This error e(n) is an error of the prediction process itself, which is different from an error like the drift component generated in the gyro sensor 26, and is a difference value between the observed value u(n) and the predicted value y(n). In the following description, this error e(n) is referred to as "a prediction process error". Character (n) of each of the values u, y and e indicates that the value is an n-th sampling value.

First, description will be made of an operation of the shake predictor 68 before the still image exposure. Before the still image exposure, the prediction input changeover switch 43a is connected to the contact point 43b, the adaptive process switch 45 is turned on, and the output changeover switch 46a is connected to the contact point 46c.

In this state, the prediction input changeover switch 43a outputs u(n−1) obtained by delaying the observed value u(n) from the input terminal 41 by one unit by one of the unit delayers 42, and this delayed observed value u(n−1) is input to the linear predictor 51. The linear predictor 51 outputs the predicted value y(n) depending on the delayed observed value u(n−1). That is, the linear predictor 51 produces a current predicted value y(n) on a basis of an observed value u(n−1) obtained at a one-unit previous sampling time. In this embodiment, such a process to obtain a current predicted value from a previous observed value sampled at a one or more-unit previous sampling time is referred to as "the prediction process". A detailed description of the prediction process will be made later.

The subtractor 53 calculates the prediction process error e(n) that is the difference value between the observed value u(n) and the predicted value y(n) by the following expression:

$$e(n)=u(n)-y(n).$$

The adaptive processor 52 updates, by using the prediction process error e(n), the filter coefficients of the linear predictor 51 (that is, of the prediction filter) with a proper adaptive algorithm. In this embodiment, an operation performed by the adaptive processor 52 in order to properly update the linear predictor 51 is referred to as "the adaptive process". A detailed description of the adaptive process will be made later. The observed value u(n) is output through the output changeover switch 46a to the output terminal 48.

As described above, in a state before the still image exposure where the motion vector detection signal is obtained from the motion vector detector 14, the shake predictor 68 directly outputs the motion vector detection signal input from the input terminal 41 to the output terminal 48, and therewith the adaptive processor 52 performs the adaptive process for the linear predictor 51.

On the other hand, an operation of the shake predictor 68 in a state during the still image exposure where no motion vector detection signal is obtained, that is, no observed value u(n) is obtained is as follows. During the still image exposure, the prediction input changeover switch 43a is connected to the contact point 43c, the adaptive process switch 45 is turned off, and the output changeover switch 46a is connected to the contact point 46b.

In this state, the prediction input changeover switch 43a outputs a one-unit previous predicted value y(n−1) from the other unit delayer 42, and this previous predicted value y(n−1) is input to the linear predictor 51. The linear predictor 51 outputs a current predicted value y(n) depending on the input previous predicted value y(n−1). The adaptive process switch 45 is turned off, and thereby the adaptive processor 52 and the subtractor 53 stop their operations. The predicted value y(n) is output through the output changeover switch 46a to the output terminal 48.

As described above, during the still image exposure, the shake predictor 68 outputs the predicted value y(n) produced by the linear predictor 51 to the output terminal 48 and stops the operation of the adaptive processor 52.

In this embodiment, it is necessary for the lens controller 25 to recognize beforehand whether or not it is during the still image exposure. Therefore, the camera controller 10 sends, in response to the input of the second release signal SW2 from the operation unit 15, a signal (notice) indicating that it is during the still image exposure to the lens controller 25.

Next, with referring to FIGS. 6A and 6B, the detailed description will be made of the configurations and operations of the linear predictor 51 and the adaptive processor 52. FIG. 6A illustrates the operations thereof before the still image exposure, and FIG. 6B illustrates the operations thereof during the still image exposure. FIGS. 6A and 6B illustrate only the operations of the linear predictor 51 and components therearound, each of which does not illustrate components such as the switches 43a and 46a illustrated in FIG. 5 and having no relation to the description herein. In FIGS. 6A and 6B, components identical to those in FIG. 5 are denoted by the same reference numerals as those in FIG. 5. Reference numeral 44 denotes the filter coefficients, and 47 an adder.

As illustrated in FIG. 6A, the linear predictor 51 is constituted by a so-called transversal filter. However, the linear predictor 51 may use other filters (such as a lattice filter), each of which can use a proper adaptive algorithm.

First, the adaptive process will be described. In a case of performing the adaptive process illustrated in FIG. 6A, as clear from the figure, a current predicted value y(n) is obtained using following expression (1):

$$y(n) = \sum_{i=1}^{M} h_n(i)u(n-i), \qquad (1)$$

where M represents an order of the filter, which is appropriately set depending on a sampling frequency for a target signal on which the prediction process or the adaptive process is performed, a time period during which the prediction process in performed and others.

Although there are proposed various adaptive algorithms for the adaptive process, description will be made of an LMS (Least Mean Square) algorithm. The LMS algorithm is derived from a gradient method and updates the filter coefficient $h_n$ by following expression (2):

$$h_{n+1}(i)=h_n(i)+\mu e(n)u(i) \ (i=1,2,\ldots,M) \qquad (2)$$

where a lower-right index n added to h represents that the filter coefficient $h_n$ is a filter coefficient for an n-th sampling, and μ represents a positive coefficient, called a step-size parameter.

The LMS algorithm utilizes a steepest descent method and causes the filter coefficient $h_n$ to approach from its initial value to a value minimizing a mean square error. When the prediction process error e(n) is sufficiently small, that is, the predicted value y(n) is an approximate value sufficiently close to the observed value u(n), the adaptive process provides a small update amount.

Next, the prediction process will be described. In a case illustrated in FIG. 6B, the prediction process uses the predicted value y(n) instead of the observed value u(n). FIG. 6B illustrates an example in which the prediction process uses y(n−1) instead of u(n−1). On the other hand, in a further previous prediction, the observed value is used as an input value, so that FIG. 6B illustrates a case where an adequate observed value as the input value in one prediction is not obtained.

If the above-described adaptive process sufficiently decreases the prediction process error e(n), u(n−1) becomes nearly equal to y(n−1). Therefore, it is expected that the predicted value y(n) reobtained by replacing the observed value as the input value with the predicted value y(n−1) in one prediction be a good approximate value. In a next prediction, as the input value, y(n) is used instead of u(n). Repeating such processes enables performing not only one prediction, but also multiple predictions.

Although, the sampling frequency of the A/D converter 61 that digitizes (A/D-converts) the angular velocity signal from the gyro sensor 26 is set equal to the sampling frequency of the image sensor 11 as described above, the sampling frequency of the A/D converter 61 may be other frequencies.

In general, sampling frequencies of image sensors are lower than those of gyro sensors or the like. For example, the sampling frequencies of the image sensor are set to 30 to 240 Hz, and on the other hand, the sampling frequencies of the gyro sensors or the like are set to 1 to 50 kHz. Thus, this embodiment sets the sampling frequency of the A/D converter 61 to be equal to that of the image sensor 11. However, the sampling frequency of the A/D converter 61 may be set to be higher than that of the image sensor 11 as long as sampling rates for the high frequency gyro shake signal the predicted shake signal added together at the adder 69 coincide with each other.

For example, a downsampler that decreases the sampling frequency is provided between the A/D converter 61 and the integrator 62. The downsampler downsamples, with a sampling frequency equal to that of the image sensor 11, the angular velocity signal sampled with a high frequency by the A/D converter 61. Furthermore, an upsampler that increases the sampling frequency is provided after the adder 69. The upsampler upsamples the combined shake signal from the adder 69 with a sampling frequency equal to the original sampling frequency of the A/D converter 61. However, irrespective of the sampling frequency of the A/D converter 61, the cut-off frequency of the HPF 66 and LPF 67 is set to be equal to or lower than a Nyquist frequency that is half (½) of the sampling frequency (frame rate) of the image sensor 11.

Alternatively, downsampling that decreases the sampling frequency for the motion vector detection signal to be lower than the sampling frequency (predetermined frequency) of the image sensor 11 may be performed before the shake predictor 68. The predicted filter of the shake predictor 68 is constituted by an FIR filter, and thus a somewhat large number of filter taps are required for predicting the low frequency component of the motion vector. For example, to predict a signal of a frequency F1(Hz), it is desirable that, as shown by following expression (3), a product of a filter tap number N and an inverse of a sampling frequency fs include one cycle of the frequency F1.

$$\frac{N}{fs} > \frac{1}{F1} \qquad (3)$$

That is, predicting the low frequency component requires a larger filter tap number than that for predicting a high frequency component, which results in an increase in calculation circuit size. Thus, decreasing the sampling frequency enables predicting the low frequency component while reducing an increase in the filter tap number. Typically, decreasing a sampling frequency for a signal by downsampling loses a high frequency component included in the signal. However, this embodiment produces the low frequency component by the prediction process, which enables reducing the calculation circuit size without deteriorating accuracy.

Furthermore, providing an upsampler that increases the sampling frequency for the predicted shake signal after the shake predictor 68 allows the sampling frequency for the predicted shake signal to coincide with the sampling frequency (predetermined frequency) of the image sensor 11.

Alternatively, a configuration may be employed which originally decreases the sampling frequency (frame rate) of the image sensor 11 and provides an upsampler only after the shake predictor 68. The upsampler enables the sampling frequency for the predicted shake signal to coincide with the sampling frequency of the gyro sensor side A/D converter 61.

In addition, the cut-off frequency of the HPF 66 and LPF 67 may be changed depending on a condition of the camera 1 or an image capturing condition. For example, a cut-off frequency changer (frequency changing unit) that changes the cut-off frequency of the HPF 66 and LPF 67 is provided inside the image stabilization controller 30.

Then, the camera controller 10 provides, to the cut-off frequency changer, an instruction to cause the cut-off frequency changer to change the cut-off frequency to a value corresponding to the condition of the image capturing apparatus or the image capturing condition. The condition of the camera 1 includes, for example, a condition of the gyro sensor 26, that is, a drift generation condition (a frequency of the drift component) of the gyro sensor 26. The image capturing condition includes an exposure time for the still image exposure.

Description will be made of a case of changing the cut-off frequency depending on the frequency of the drift component. Before the still image exposure, both the gyro shake detection signal and the motion vector detection signal can be obtained in the entire frequency range. If the gyro shake detection signal includes no drift component generated in the gyro sensor 26, the gyro shake detection signal indicates approximately the same camera shake amount as that indicated by the motion vector detection signal. That is, obtaining a difference between these two detection signals enables extracting the drift component generated in the gyro sensor 26. A frequency component generated as the drift component does not significantly change during a short period of time from framing before the still image exposure to an end of the still image exposure.

Figure 7A:
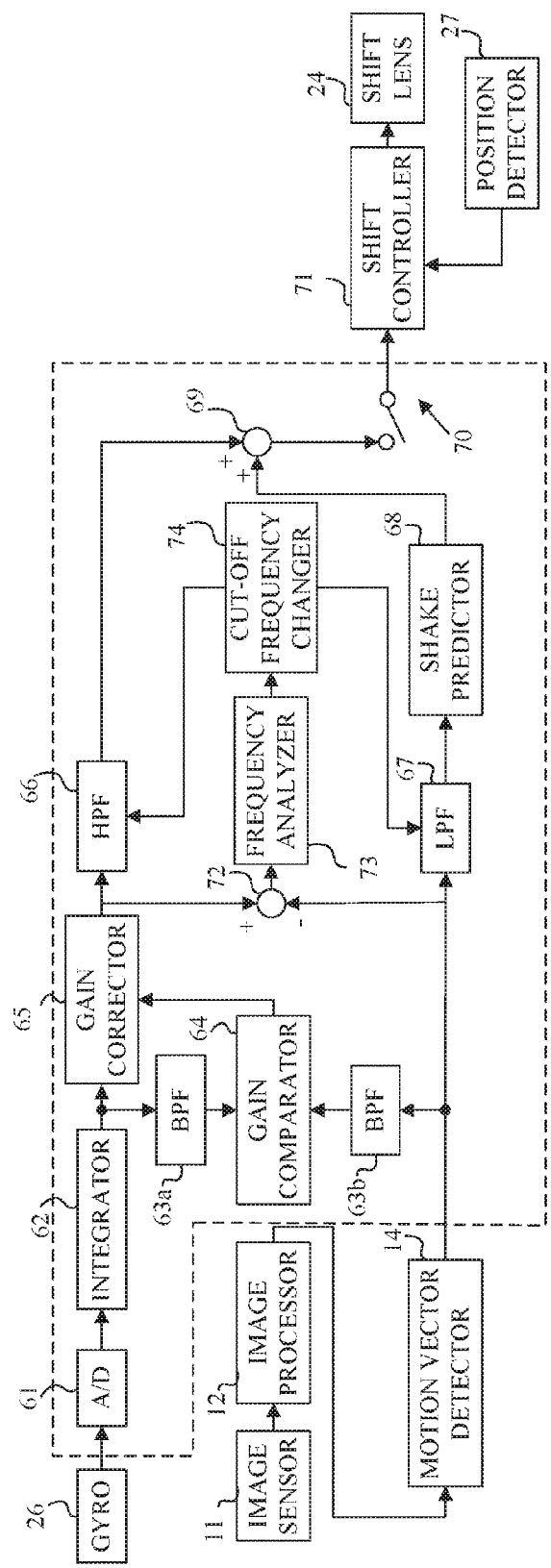
FIGS. 7A and 7B illustrate modified examples of Embodiment 1.

Thus, as illustrated in FIG. 7A, this embodiment adds, to the configuration illustrated in FIG. 1, a difference extractor (error extracting unit) 72, a frequency analyzer (analyzing unit) 73 and a cut-off frequency changer 74. The difference extractor 72 calculates, before the still image exposure, the difference between the gyro shake detection signal from the gain corrector 65 and the motion vector detection signal from the motion vector detector 14 to extract the drift component (error component). The frequency analyzer 73 performs a frequency analysis such as a fast Fourier transform (FFT) on the drift component extracted by the difference extractor 72 to calculate, as its analysis result, the frequency of the drift component.

The cut-off frequency changer 74 changes the cut-off frequency of the HPF 66 and LPF 67 to a frequency proper to remove the drift component having the frequency calculated by the frequency analyzer 73 (that is, to a frequency higher than the frequency of the drift component). The cut-off frequency is desirable to be as low as possible as long as the drift component can be removed, so that changing the cut-off frequency depending on the calculated frequency of the drift component is effective for performing a good image stabilization control.

Next, description will be made of a case of changing the cut-off frequency depending on the exposure time. For example, although this embodiment simply adds together the high frequency gyro shake signal and the predicted shake signal (low frequency component) during the still image exposure, the cut-off frequency may be changed depending on a length of an elapsed time (hereinafter referred to as "an elapsed exposure time") from a start of the still image exposure.

For example, as the elapsed exposure time increases, a prediction accuracy of the predicted shake signal further deteriorates, so that it is desirable that the cut-off frequency changer 74 illustrated in FIG. 7A gradually decrease the cut-off frequency as the elapsed exposure time from the start of the still image exposure increases. For example, the cut-off frequency changer 74 maintains the cut-off frequency at its initial set value during a time period of ¼ sec as a predetermined time period from the start of the still image exposure and gradually decreases the cut-off frequency after the time period of ¼ sec. Then, after the cut-off frequency decreases to a predetermined lower limit frequency, substantially only the high frequency gyro shake signal is used for the image stabilization control.

That is, during the first predetermined time period in the exposure time, the image stabilization control is performed using the combined shake signal produced by utilizing the predicted shake signal. Thereafter, however, a utilization ratio of the predicted shake signal is decreased, and a utilization ratio of the high frequency gyro shake signal is increased. That is, weights on the predicted shake signal and the high frequency gyro shake signal at their combination are changed. Controlling the cut-off frequency as described above enables performing an image stabilization control with good accuracy even in a long-time exposure.

Furthermore, a proper exposure time of the still image exposure may be calculated (set) before the still image exposure, depending on an exposure amount detected by an exposure amount detector (not illustrated), and then the cut-off frequency may be changed depending on a length of the set exposure time. Moreover, as described above, as the exposure time increases, the prediction accuracy of the predicted shake signal further deteriorates. Therefore, when the set exposure time is long, the cut-off frequency may be set to be lower than the initial set value before the still image exposure.

The motion vector detector 14 detects the displacement of the object image on the image sensor 11 and therefore can detect a shift shake of the camera 1, which is a shake parallel to an image capturing surface of the image sensor 11. The shift shake is likely to affect on image capturing when the object distance is short and the image magnification is large. On the other hand, the gyro sensor 26 is an angular velocity sensor that can detect an angular shake but cannot detect the shift shake. That is, although during the still image exposure only the angular shake can be detected by the gyro sensor 26, the image stabilization control performed using the predicted shake signal as the low frequency component also reduces the shift shake. Thus, this embodiment is effective for image capturing significantly affected by the shift shake because of a large image magnification.

Moreover, although this embodiment described the lens-integrated camera 1 including the image capturing lens 2 and the image sensor 11, the image stabilization control described in this embodiment can be also applied to a case of using a camera provided with an image sensor and an interchangeable lens (optical apparatus) detachably attachable to the camera.

In this case, the image stabilization controller 30 may be included in any one of the camera controller 10 provided with the camera and the lens controller 25 provided with the interchangeable lens. In the case where the image stabilization controller 30 is included in the lens controller 25, the image stabilization controller 30 obtains the motion vector detection signal and information indicating the start of the still image exposure from the camera through communication therebetween. On the other hand, in the case where the image stabilization controller 30 is included in the camera controller 10, the image stabilization controller 30 receives the gyro shake detection signal from the interchangeable lens and sends the combined shake signal produced by the image stabilization controller 30 to the lens controller 25. The gyro sensor 26 may be provided to the camera.

Furthermore, although this embodiment described the case of shifting the shift lens 24 as the optical image stabilizing element in the directions orthogonal to the image capturing optical axis, another configuration may be employed in which the image sensor 11 shifts in the directions orthogonal to the image capturing optical axis or the entire image capturing lens 2 (that is, the image capturing optical axis) tilts. In this case, the image sensor 11 and the image capturing lens 2 are also each an optical image stabilizing element.

In addition, although this embodiment described the case of using the prediction filter that uses the adaptive algorithm in the motion vector prediction process, other algorithms may be used. For example, an exposure time of about ⅓₀ sec corresponds to ¼ cycle or less of a low frequency component of about 0.1 to 1 Hz, so that even when using the linear prediction that uses a slope of change of the motion vector before the still image exposure for simplification, an acceptable prediction accuracy can be obtained.

Figure 7B:
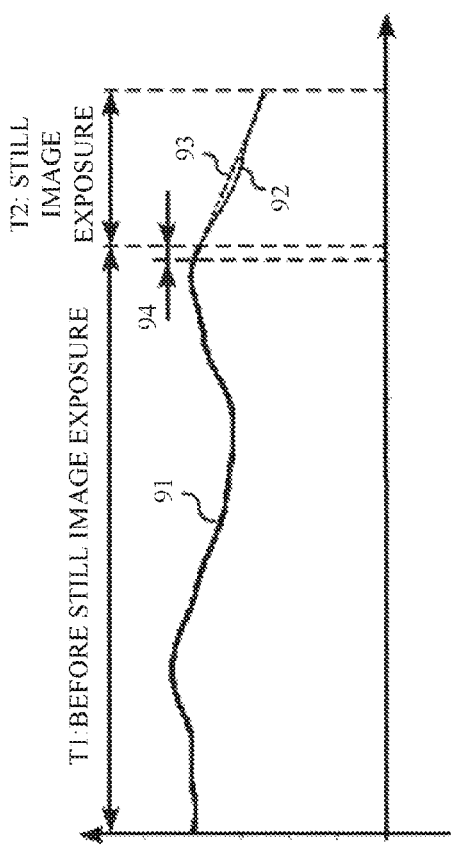

With referring to FIG. 7B, description will be made of the linear prediction of the motion vector. Although FIG. 3 illustrated the motion vectors in the entire frequency range, FIG. 7B illustrates the low frequency component of the motion vector. A bold solid line 91 illustrates a low-frequency motion vector signal having been detected by the motion vector detector 14 and having passed through the LPF 67. A thin solid line 92 illustrates a low frequency motion vector signal during the still image exposure, and a dashed line 93 illustrates the predicted shake signal during the still image exposure.

The predicted shake signal 93 is obtained by the linear prediction that straight extends a slope of the motion vector in a time period 94 immediately before the still image exposure. As illustrated by the thin solid line 92 in FIG. 7B, a short exposure allows predicting the low frequency component with an acceptable accuracy even when using the linear prediction, which enables performing a good image stabilization control.

Furthermore, although this embodiment described the case of extracting the low frequency component of the motion vector detection signal by using the LPF 67, the sampling frequency of the image sensor 11 may be set to ½ of the cut-off frequency corresponding to the low frequency component to be extracted so as to enable extracting a desired low frequency component of the motion vector detection signal without using the LPF 67 according to the sampling theorem, which makes it possible to configure a simple circuit.

Figure 10:
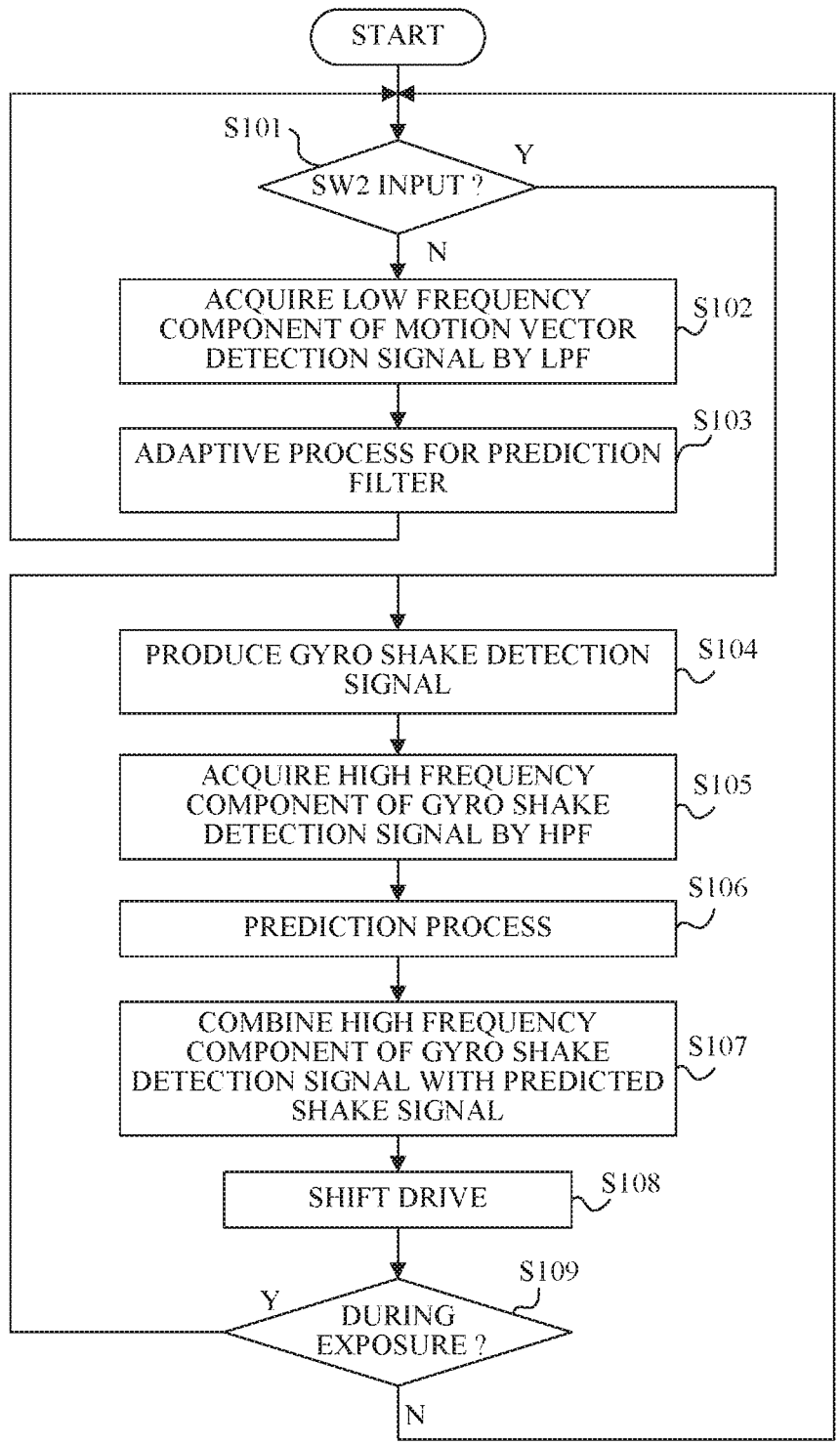
FIG. 10 is a flowchart illustrating an image stabilization control process in Embodiment 1.

When the image stabilization controller 30 is constituted by a computer, the image stabilization controller 30 may execute an image stabilization controlling process corresponding to the process described in this embodiment, according to an image stabilization controlling program as a computer program. FIG. 10 illustrates the image stabilization controlling process executed by the image stabilization controller 30 as a computer according to the image stabilization controlling program.

At step S101, the image stabilization controller 30 determines whether or not the input of the second release signal SW2 is noticed by the camera controller 10. If the input of the second release signal SW2 is not noticed, the image stabilization controller 30 proceeds to step S102. If the input thereof is noticed, that is, if it is during the still image exposure, the image stabilization controller 30 proceeds to step S104.

At step S102, the image stabilization controller 30 acquires the motion vector detection signal from the motion vector detector 14 and acquires the low frequency component of the motion vector detection signal through an LPF.

Then, at step S103, the image stabilization controller 30 performs, by using the low frequency component of the motion vector detection signal, the above-described adaptive process for the prediction filter.

Thereafter, the image stabilization controller 30 returns to step S101 to determine again whether or not the input of the second release signal SW2 is noticed. If not, the image stabilization controller 30 repeats the processes at steps S102 and S103.

On the other hand, at step S104, the image stabilization controller 30 A/D-converts and integrates the angular velocity signal from the gyro sensor 26 to produce the gyro shake detection signal.

Next, at step S105, the image stabilization controller 30 acquires the high frequency component of the gyro shake detection signal through an HPF.

Then, at step S106, the image stabilization controller 30 performs the prediction process to calculate the predicted shake signal and adds together (combines), at step S107, the high frequency component of the gyro shake detection signal and the predicted shake signal to produce the combined shake signal.

Next, at step S108, the image stabilization controller 30 performs the shift drive of the shift lens 24 (that is, the image stabilization control) using the combined shake signal.

Finally, at step S109, the image stabilization controller 30 determines whether or not it is during the still image exposure. If it is during the still image exposure, the image stabilization controller 30 returns to step S104 to repeat the processes at steps S104 to 108. On the other hand, if the still image exposure is ended, the image stabilization controller 30 returns to step S101.

As described above, the image stabilization control in this embodiment is effective for the image capturing significantly affected by the shift shake because of a large image magnification. Thus, the cut-off frequency may be increased from the initial set value depending on the image magnification. With referring to flowcharts of FIGS. 11A and 11B, description will be made of a process, which is performed by the image stabilization controller 30, to increase the cut-off frequency from the initial set value depending on the image magnification.

At step S201, the image stabilization controller 30 determines whether or not the input of the second release signal SW2 is noticed by the camera controller 10. If the input of the second release signal SW2 is not noticed, the image stabilization controller 30 proceeds to step S202. If the input thereof is noticed, the image stabilization controller 30 proceeds to step S205.

Figure 11A:
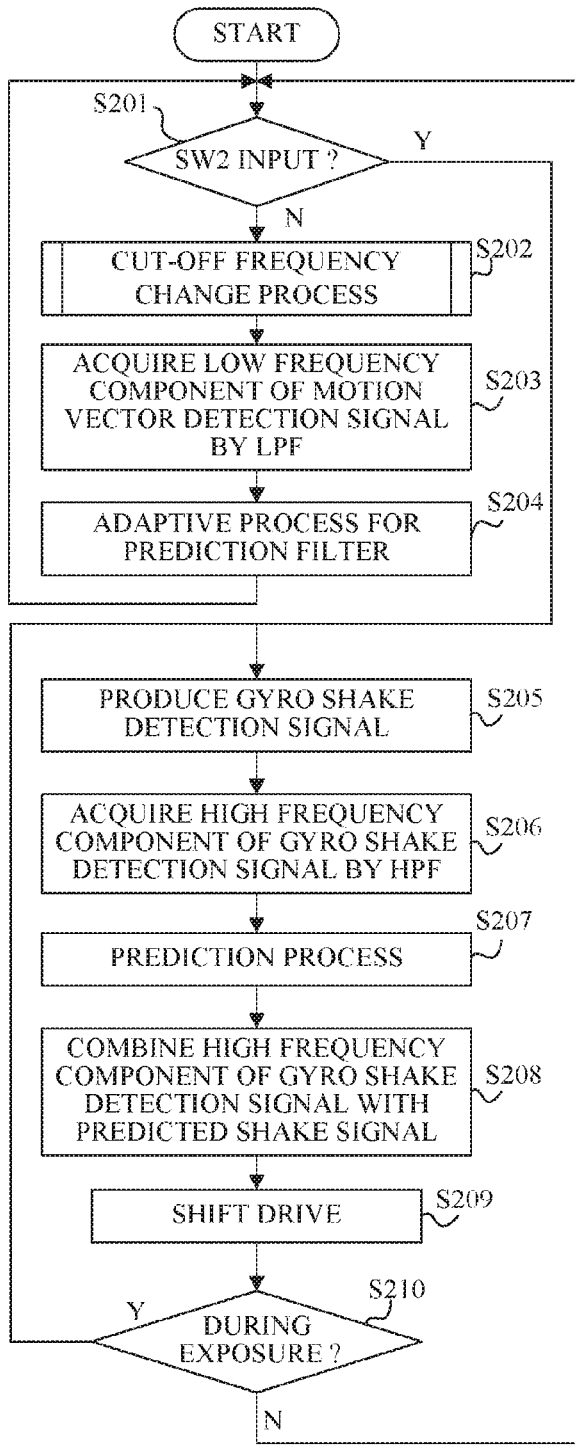
FIGS. 11A and 11B are flowcharts illustrating another image stabilization control process in Embodiment 1.
Figure 11B:
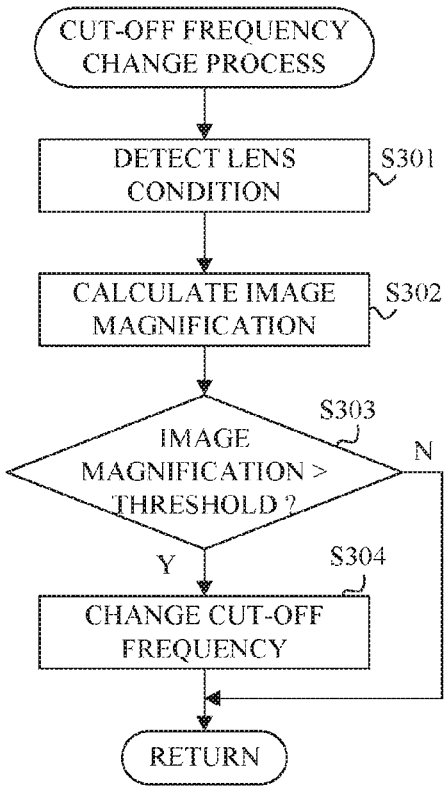

At step S202, the image stabilization controller 30 performs a cut-off frequency change process that is a subroutine process illustrated by the flowchart of FIG. 11B.

At step S301, the image stabilization controller 30 detects, through the lens controller 25, a lens condition of the image capturing lens 2 including a position of the focus lens 22 and the focal length of the image capturing optical system 20.

At step S302, the image stabilization controller 30 as an image magnification detecting unit calculates the image magnification of the object image on a basis of the detected lens condition.

At step S303, the image stabilization controller 30 determines whether or not the calculated image magnification is larger than a predetermined image magnification threshold. If the calculated image magnification is larger than the predetermined image magnification threshold, the image stabilization controller 30 proceeds to step S304 because the shift shake may significantly affects image capturing, and otherwise ends this subroutine process.

At step S304, the image stabilization controller 30 as a frequency changing unit increases the cut-off frequency to a higher frequency than before and then ends this subroutine process.

After the cut-off frequency change process (subroutine process) is ended, the image stabilization controller 30 returns to step S203 in the flowchart of FIG. 11A. Processes from step S203 to step S210 are identical to those from step S102 to step S109 in FIG. 10, and therefore description thereof is omitted.

As described above, controlling the cut-off frequency so as to be changed when the image magnification is larger than the threshold enables performing the image stabilization control using the prediction process even in a higher frequency range than a frequency range of the shift shake that is cut off with a conventional cut-off frequency.

The cut-off frequency is desirable to be set by taking into account a prediction accuracy of the shake predictor 68 using the motion vector detection signal from the motion vector detector 14 and an assumed shift shake amount not detected by the gyro sensor 26.

Use of the increased cut-off frequency in the image capturing with a large image magnification (that is, in the image capturing significantly affected by the shift shake) as described above causes the image stabilization control against the angular shake in a lower frequency range than the increased cut-off frequency to use the predicted shake signal, which may deteriorate the accuracy as compared to the case of using the gyro shake detection signal. However, use of the increased cut-off frequency enables performing the image stabilization control using the prediction process for the shift shake in a frequency range where the shift shake has not conventionally been corrected. As a result, a still image in which image blur is further reduced can be obtained as compared to a case of performing a conventional image stabilization control.

Alternatively, the operation of the shake predictor 68 may be controlled as follows by using the angular velocity signal from the gyro sensor 26.

The shake predictor 68 performs the adaptive process to update the prediction filter. However, an abrupt disturbance or the like impedes a desirable update of the filter coefficients, which requires a long time to restabilize the prediction filter.

For example, when a user (photographer) pressing the release switch (SW1) pans the camera 1 widely, the motion vector detector 14 detects a large shake that is different from user's hand jiggling. Updating the filter coefficients in the shake predictor 68 using the motion vector detection signal obtained thereat significantly changes the filter coefficients, which requires a long time to restabilize the prediction filter.

On the other hand, the motion vector used by the shake predictor 68 is detected by comparison between two frame images produced through consecutive exposures, so that the detection of the motion vector slightly delays with respect to the shake detection by the gyro sensor 26, though depending on the frame rate.

For example, if the frame rate is 60 fps, the sampling rate of the motion vector detector 14 is 60 fps, and on the other hand, the sampling rate of the gyro sensor 26 is from 500 Hz to several kHz. However, the motion vector detection signal from the motion vector detector 14 is a low frequency signal, so that direct use of the motion vector detection signal for the image stabilization control generates little image stabilization error due to the delay.

Thus, when the gyro sensor 26 detects a large camera shake such as panning, the update of the filter coefficients as the adaptive process may be temporarily stopped as follows.

Figures 12A, 12B:
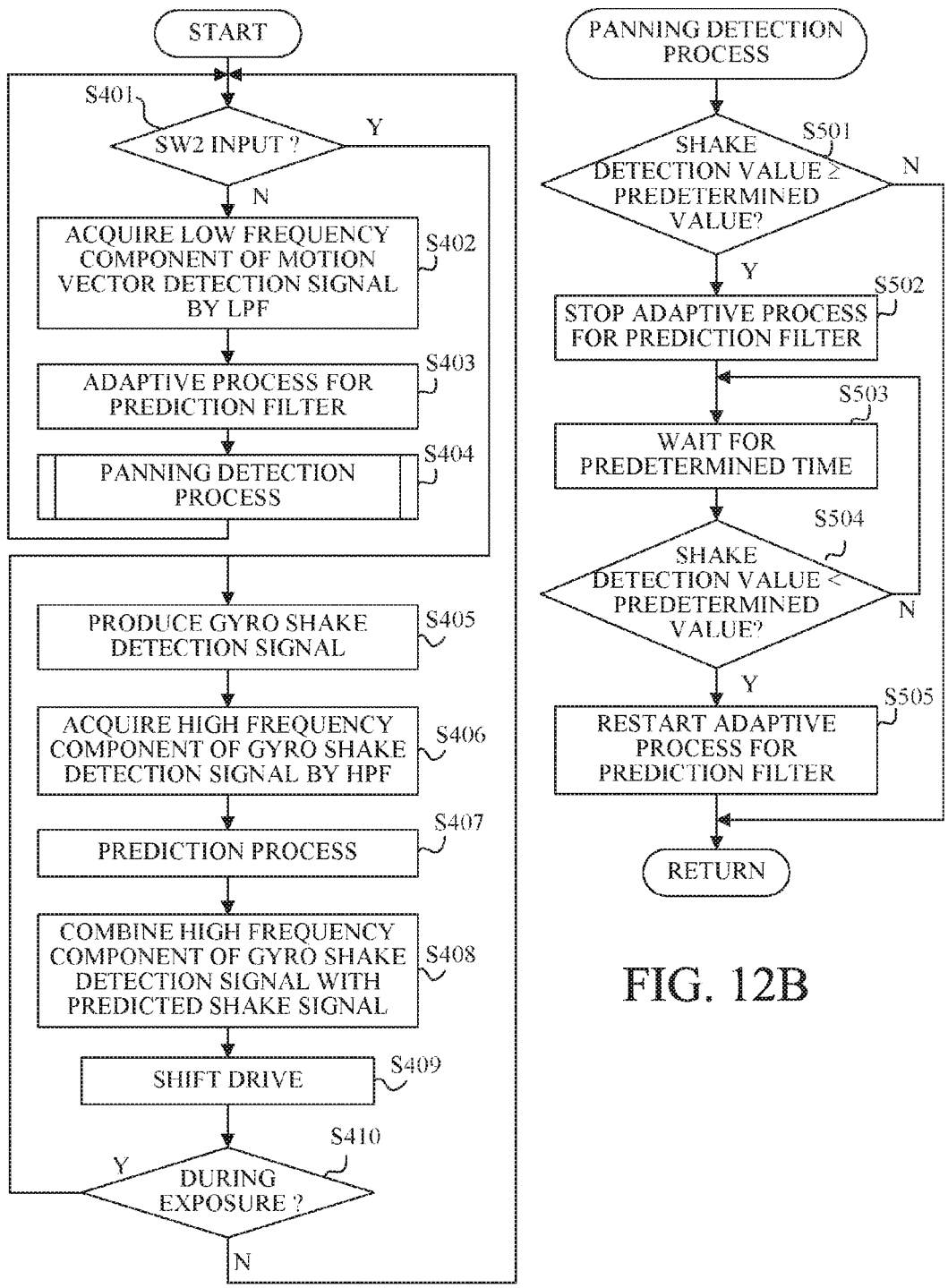
FIGS. 12A and 12B are flowcharts illustrating further another image stabilization control process in Embodiment 1.

With referring to flowcharts of FIGS. 12A and 12B, description of the above-described control that temporarily stops the update of the filter coefficients.

At step S401, the image stabilization controller 30 determines whether or not the input of the second release signal SW2 is noticed by the camera controller 10. If the input of the second release signal SW2 is not noticed, the image stabilization controller 30 proceeds to step S402. If the input thereof is noticed, the image stabilization controller 30 proceeds to step S405.

At step S402, the image stabilization controller 30 acquires the motion vector detection signal from the motion vector detector 14 and acquires the low frequency component of the motion vector detection signal through an LPF. Then, at step S403, the image stabilization controller 30 stats, by using the low frequency component of the motion vector detection signal, the above-described adaptive process for the prediction filter.

At step S404, the image stabilization controller 30 performs a panning detection process that is a subroutine process illustrated by a flowchart of FIG. 12B.

At step S501 in FIG. 12B, the image stabilization controller 30 determines whether or not the camera shake amount (hereinafter referred to as "a shake detection value") indicated by the gyro shake detection signal from the gyro sensor 26 is equal to or larger than a predetermined value. If the shake detection value is equal to or larger than the predetermined value, the image stabilization controller 30 proceeds to step 3502. If the shake detection value is smaller than the predetermined value, the image stabilization controller 30 ends this process.

At step S502, the image stabilization controller 30 determines that a large motion of the camera 1 such as panning, which is different from hand jiggling, is performed by the user and thus temporarily stops the update of the filter coefficients as the adaptive process.

Next, at step S503, the image stabilization controller 30 waits for a predetermined time from the stoppage of the update of the filter coefficients. For example, assuming that the panning of the camera 1 is performed, the predetermined time is set to about from 0.2 to 0.5 sec. This predetermined time is sufficiently longer than an interval of the update of the filter coefficients corresponding to 60 Hz that is the sampling rate of the motion vector detector 14.

During the stoppage of the update of the filter coefficients as the adaptive process, the image stabilization controller 30 may perform the prediction process as during the still image exposure and use the predicted signal as the motion vector detection signal.

Next, at step S504, the image stabilization controller 30 determines whether or not the shake detection value from the gyro sensor 26 is smaller than the predetermined value. If the shake detection value is smaller than the predetermined value, the image stabilization controller 30 proceeds to step S505, and otherwise returns to step S503 to wait for the predetermined time again.

At step S505, the image stabilization controller 30 restarts the update of the filter coefficients as the adaptive process and then ends this process.

After the panning detection process (subroutine process) is ended, the image stabilization controller 30 returns to step S401 in the flowchart of FIG. 12A. Processes from step S405 to step S410 are identical to those from step S104 to step S109 in FIG. 10 (from step S205 to step S210 in FIG. 11A), and therefore description thereof is omitted.

As described above, when a large motion of the camera 1 such as panning, which is different from user's hand jiggling, is generated, the image stabilization controller 30 temporarily stops the update of the filter coefficients (that is, the adaptive process) until the large motion ends and then restarts the adaptive process in response to the end of the large motion. This control prevents an undesirable update of the filter coefficients, which shortens the time taken until the stabilization of the prediction filter.

Embodiment 2

With referring to FIG. 8, description will be made of a digital camera provided with an image stabilization controller 30' as an image stabilization apparatus that is a second embodiment (Embodiment 2) of the present invention.

Although Embodiment 1 described the case of starting the image stabilization control in response to the input of the second release signal SW2 that instructs the start of the still image exposure, this embodiment performs the image stabilization control before the still image exposure so as to display a live view image with little image blur on the image display unit 16. Specifically, the image stabilization controller 30' starts the image stabilization control in response to an input of the first release signal SW1 from the operation unit 15 that instructs a start of the image capturing preparation operation.

Until the input of the second release signal SW2 from the operation unit 15, the image stabilization controller 30' performs an image stabilization control using, instead of the combined shake signal described in Embodiment 1, the motion vector detection signal. Then, in response to the input of the of the second release signal SW2 from the operation unit 15, the image stabilization controller 30' performs the image stabilization control using the combined shake signal as in Embodiment 1.

A configuration of the camera in this embodiment is identical to that of the camera 1 in Embodiment 1, and therefore description thereof is omitted. In FIG. 8, components in the image stabilization controller 30' common to those in the image stabilization controller 30 in Embodiment 1 (FIG. 1) are denoted by the same reference numerals as those in Embodiment 1, and description thereof is omitted.

Figure 8:
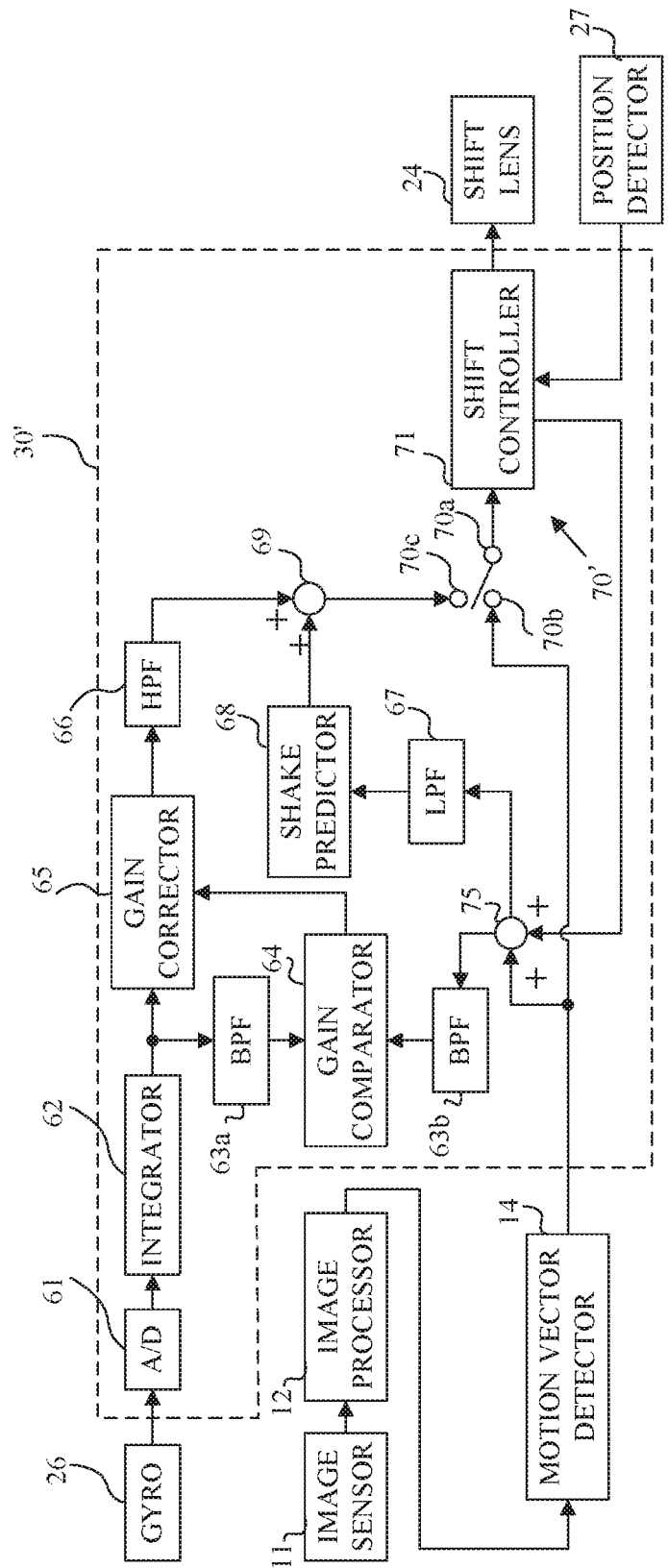
FIG. 8 is a block diagram illustrating a configuration of an image stabilization control apparatus that is Embodiment 2 of the present invention.

In FIG. 8, reference numeral 75 denotes an adder that adds together the motion vector detection signal from the motion vector detector 14 and a signal indicating a shift drive amount (control amount) provided from the shift controller 71 to the shift lens 24 to output the added signal to the BPF 63b and the LPF 67.

Reference numeral 70' denotes an output changeover switch that switches an input terminal to which an output terminal 70a connected to the shift controller 71 is connected, between terminals 70b and 70c. The motion vector detection signal is supplied to the input terminal 70b, and the combined shake signal from an adder 69 is supplied to the input terminal 70c. The output changeover switch 70' is switched in response to commands from the camera controller 10 illustrated in FIG. 2.

Before the first release switch SW1 is input, the output changeover switch 70' is in an off state where the output terminal 70a is not connected to both the input terminals 70b and 70c. In this off state, the shift drive of the shift lens 24, that is, the mage stabilization control is not performed.

In response to the input of the first release signal SW1 (that is, to a start of the image capturing preparation period), the output terminal 70a of the output changeover switch 70' is connected to the input terminal 70b. Thus, the motion vector detection signal is input to the shift controller 71, and thereby the image stabilization control using the motion vector detection signal is started.

After the start of the image stabilization control, the motion vector detection signal corresponds to an image blur (hereinafter referred to as "a remaining image blur") that cannot be removed on the image sensor 11 by the shift drive of the shift lens 24. In other words, a sum of the shift drive amount of the shift lens 24 and a motion vector corresponding to the remaining image blur is a motion vector corresponding to an actual camera shake amount.

In this embodiment, the image stabilization controller 30' extracts a low frequency component of a signal (hereinafter referred to as "an added motion vector detection signal") indicating the motion vector corresponding to the actual camera shake amount and causes a shake predictor 68 to update the prediction filter by using the extracted added motion vector detection signal (low frequency component).

Specifically, the shift controller 71 outputs, to the adder 75, a signal indicating the shift drive amount of the shift lens 24 (that is, a signal indicating a motion vector converted value). The adder 75 adds this signal to the motion vector detection signal from the motion vector detector 14. An LPF 67 extracts the low frequency component from the added motion vector detection signal produced by the addition. Then, the shake predictor 68 performs the adaptive process for the prediction filter by using the low frequency component of the added motion vector detection signal from the LPF 67.

In response to the input of the second release signal SW2 (that is, to the start of the still image exposure), the output terminal 70a of the output changeover switch 70' is connected to the input terminal 70c. The shake predictor 68 outputs, to the adder 69, a low frequency predicted shake signal calculated by the prediction filter having been subjected to the adaptive process. On the other hand, the added motion vector detection signal from the adder 75 is input through the BPF 63b to the gain comparator 64.

A gain corrector 65 corrects, depending on a comparison result of gains of the gyro shake detection signal and the added motion vector detection signal by the gain comparator 64, the gain of the gyro shake detection signal. An HPF 66 extracts a high frequency component from the gyro shake detection signal whose gain has been corrected to output the extracted high frequency component to the adder 69. The adder 69 adds together the gyro shake detection signal (high frequency component) and the predicted shake signal (low frequency component) to produce the combined shake signal to output the combined shake signal through the output changeover switch 70' to the shift controller 71. Thus, the image stabilization control using the combined shake signal is performed.

When the still image exposure is ended, the process of the shake predictor 68 and the state of the output changeover switch 70' are returned to those before the input of the first release signal SW1.

This embodiment performs the image stabilization control using the motion vector detection signal from the image capturing preparation period, that is, before the still image exposure, so that a user can perform framing while watching a live view image in which image blur is sufficiently corrected. Furthermore, this embodiment performs, during the still image exposure, as in Embodiment 1, the image stabilization control using the combined shake signal in which the low frequency component including the drift component generated in the gyro sensor 26 is removed. Thus, this embodiment can perform a good image stabilization control, without being affected by the drift component.

Embodiment 3

With referring to FIG. 9, description will be made of a digital camera provided with an image stabilization controller 30" as an image stabilization apparatus that is a third embodiment (Embodiment 3) of the present invention.

This embodiment performs, as in Embodiment 2, the image stabilization control also in the image capturing preparation period and however performs it using, not the motion vector detection signal, but the gyro shake detection signal. A configuration of the camera in this embodiment is identical to that of the camera 1 in Embodiment 1, and therefore description thereof is omitted. In FIG. 9, components in the image stabilization controller 30" common to those in the image stabilization controllers 30 and 30' in Embodiments 1 and 2 (FIGS. 1 and 8) are denoted by the same reference numerals as those in Embodiments 1 and 2, and description thereof is omitted.

Figure 9:
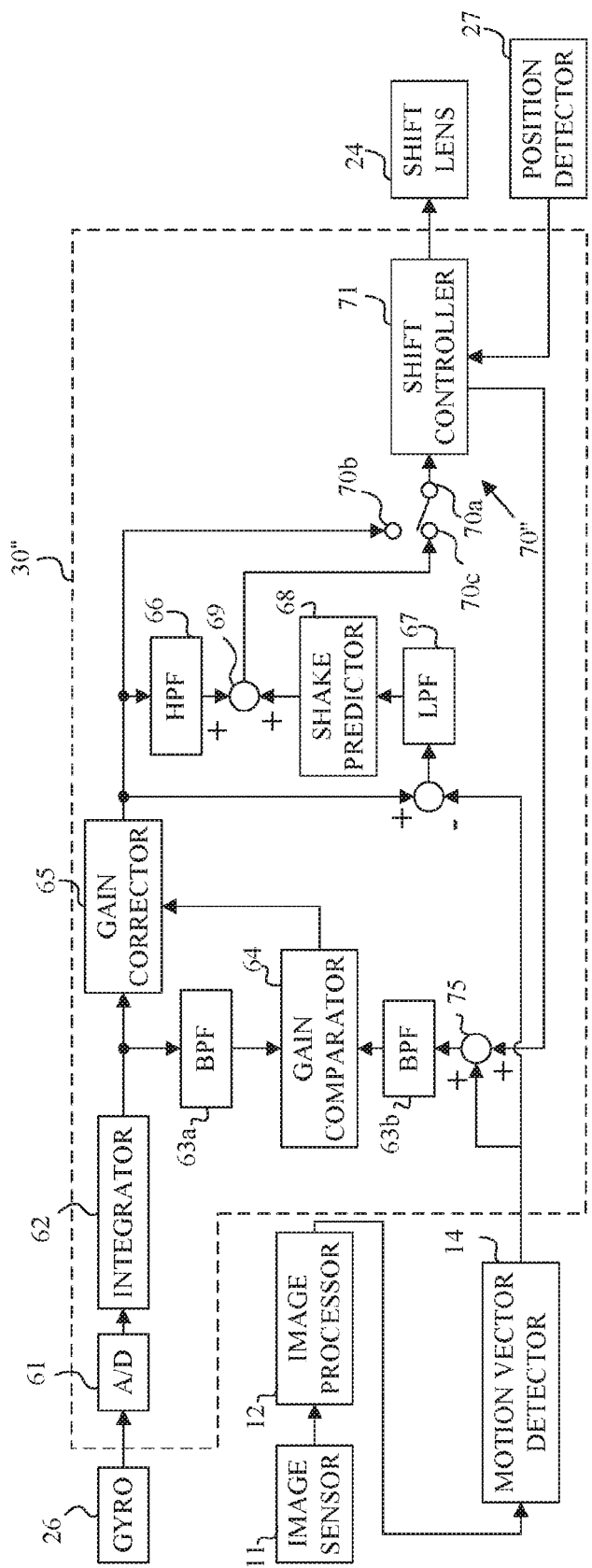
FIG. 9 is a block diagram illustrating a configuration of an image stabilization control apparatus that is Embodiment 3 of the present invention.

In FIG. 9, reference numeral 76 denotes a subtractor that outputs a difference between the gyro shake detection signal whose gain has been corrected from the gain corrector 65 and the motion vector detection signal from the motion vector detector 14 to an LPF 67. Reference numeral 70" denotes an output changeover switch that switches an input terminal to which an output terminal 70a connected to the shift controller 71 is connected, between terminals 70b and 70c. The gyro shake detection signal from the gain corrector 65 is supplied to the input terminal 70b, and the combined shake signal from an adder 69 is supplied to the input terminal 70c. The output changeover switch 70" is switched in response to commands from the camera controller 10 illustrated in FIG. 2.

Before the first release switch SW1 is input, the output changeover switch 70" is in an off state where the output terminal 70a is not connected to both the input terminals 70b and 70c. In this off state, the shift drive of the shift lens 24, that is, the mage stabilization control is not performed.

In response to the input of the first release signal SW1 (that is, to a start of the image capturing preparation period), the output terminal 70a of the output changeover switch 70" is connected to the input terminal 70b. Thus, the gyro shake detection signal whose gain has been corrected from the gain corrector 65 is input to the shift controller 71, and thereby the image stabilization control using the gyro shake detection signal is started.

In the image capturing preparation period, the motion vector detection signal from the motion vector detector 14 corresponds to the drift component generated in the gyro sensor 26. Thus, the subtractor 76 subtracts the motion vector detection signal corresponding to the drift component from the gyro shake detection signal from the gain corrector 65 to produce a gyro shake detection signal (hereinafter referred to as "a drift-removed gyro shake detection signal) in which the drift component is removed. The LPF 67 extracts a low frequency component from the drift-removed gyro shake detection signal from the subtractor 76, and a shake predictor 68 performs the adaptive process for the prediction filter by using the low frequency component of the drift-removed gyro shake detection signal from the LPF 67.

In response to the input of the second release signal SW2 (that is, to the start of the still image exposure), the output terminal 70a of the output changeover switch 70" is connected to the input terminal 70c. The shake predictor 68 outputs, to the adder 69, a low frequency predicted shake signal calculated by the prediction filter having been subjected to the adaptive process. This embodiment calculates, not the predicted shake signal as the predicted value of the motion vector as in Embodiments 1 and 2, but a predicted shake signal as a predicted value of the drift-removed gyro shake detection signal. However, as described above, this embodiment also uses, as in Embodiments 1 and 2, the motion vector detection signal in the adaptive process for the prediction filter.

On the other hand, as in Embodiment 2, the added motion vector detection signal from the adder 75 is input through the BPF 63b to the gain comparator 64.

As in Embodiment 2, the gain corrector 65 corrects, depending on the comparison result of the gains of the gyro shake detection signal and the added motion vector detection signal by the gain comparator 64, the gain of the gyro shake detection signal. The HPF 66 extracts the high frequency component from the gyro shake detection signal whose gain has been corrected to output the extracted high frequency component to the adder 69. The adder 69 adds together the gyro shake detection signal (high frequency component) and the predicted shake signal (low frequency component) to produce the combined shake signal to output the combined shake signal through the output changeover switch 70" to the shift controller 71. Thus, the image stabilization control using the combined shake signal is performed.

When the still image exposure is ended, the process of the shake predictor 68 and the state of the output changeover switch 70" are returned to those before the input of the first release signal SW1.

This embodiment performs the image stabilization control using the drift-removed gyro shake detection signal from the image capturing preparation period, that is, before the still image exposure, so that a user can perform framing while watching a live view image in which image blur is sufficiently corrected. Furthermore, this embodiment performs, during the still image exposure, as in Embodiment 1, the image stabilization control using the combined shake signal in which the low frequency component including the drift component generated in the gyro sensor 26 is removed. Thus, this embodiment can perform a good image stabilization control, without being affected by the drift component.

Each of the above-described embodiments performs the image stabilization control using the second shake signal obtained by combining the first shake signal not including the low frequency component that includes the error component and the predicted shake signal predicted by using the motion vector detection signal, which enables performing a good image stabilization control even during the still image capturing where no motion vector is obtained.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-087848, filed on Apr. 22, 2015, and 2016-074495, filed on Apr. 1, 2016 which are hereby incorporated by reference herein in their entirety.

What is claimed is:

1. An image stabilization control apparatus configured to perform an image stabilization control to reduce image blur due to shaking of an optical apparatus by using a shake detection signal obtained through detection of the shaking of the optical apparatus and a motion vector detection signal indicating a motion vector detected in an image signal produced through image capturing using the optical apparatus, the image stabilization control apparatus comprising:
a shake extracting unit configured to extract a first shake signal from the shake detection signal, the first shake signal being a frequency component whose frequency is higher than a predetermined frequency;
one or more processors; and
a memory storing instructions which, when executed by the one or more processors, cause the image stabilization control apparatus to function as:
a predicting unit configured to produce, by using the motion vector detection signal, a predicted shake signal indicating a predicted value of the shaking;
a combining unit configured to combine the first shake signal with the predicted shake signal to produce a second shake signal;
a controlling unit configured to perform the image stabilization control by using the second shake signal; and
a motion vector extracting unit configured to extract a specific motion vector signal from the motion vector detection signal, the specific motion vector signal being a frequency component whose frequency is lower than the predetermined frequency,
wherein:
the controlling unit is configured to perform the image stabilization control by using the second shake signal in still image capturing, and
the predicting unit is configured to produce the predicted shake signal by using the specific motion vector signal.

2. An image stabilization control apparatus configured to perform an image stabilization control to reduce image blur due to shaking of an optical apparatus by using a shake detection signal obtained through detection of the shaking of the optical apparatus and a motion vector detection signal indicating a motion vector detected in an image signal produced through image capturing using the optical apparatus and an image sensor, the image stabilization control apparatus comprising:
a shake extracting unit configured to extract a first shake signal from the shake detection signal, the first shake signal being a frequency component whose frequency is higher than a predetermined frequency;
one or more processors; and
a memory storing instructions which, when executed by the one or more processors, cause the image stabilization control apparatus to function as:
a predicting unit configured to produce, by using the motion vector detection signal, a predicted shake signal indicating a predicted value of the shaking;
a combining unit configured to combine the first shake signal with the predicted shake signal to produce a second shake signal;
a controlling unit configured to perform the image stabilization control by using the second shake signal; and
a frequency changing unit configured to change the predetermined frequency depending on at least one of an elapsed exposure time of the image sensor from start of its exposure in the image capturing and a predetermined exposure time of the image sensor determined before the image capturing.

3. An image stabilization control apparatus according to claim 1, wherein the predicting unit is configured to produce the predicted shake signal by using a prediction filter and perform, before producing the predicted shake signal, an adaptive process to update the prediction filter by using the motion vector detection signal.

4. An image stabilization control apparatus according to claim 1, wherein the predetermined frequency is set to be equal to or lower than half of a sampling frequency of an image sensor used in the image capturing.

5. An image stabilization control apparatus according to claim 1, further functioning as:
an error extracting unit configured to extract, from a difference between the shake detection signal and the motion vector detection signal, an error component included in the shake detection signal;
an analyzing unit configured to analyze a frequency of the error component; and
a frequency changing unit configured to change the predetermined frequency, depending on an analysis result of the frequency of the error component.

6. An image stabilization control apparatus according to claim 4, further functioning as a sampling unit configured to downsample the specific motion vector signal produced at a predetermined sampling frequency and to upsample, with the predetermined sampling frequency, the predicted shake signal produced by using the downsampled specific motion vector signal.

7. An image stabilization control apparatus according to claim 1, wherein the predicting unit is configured to produce, when the controlling unit performs the image stabilization control by using the motion vector detection signal instead of the second shake signal, the predicted shake signal by using a signal obtained by adding together a control amount in the image stabilization control and the motion vector detection signal.

8. An image stabilization control apparatus according to claim 1, wherein the predicting unit is configured to produce, when the controlling unit performs the image stabilization control by using the motion vector detection signal instead of the second shake signal, the predicted shake signal by using a difference between the shake detection signal and the motion vector detection signal.

9. An image stabilization control apparatus according to claim 1, further functioning as:
an image magnification detecting unit configured to detect, from an image capturing state of the optical apparatus, an image magnification at which an object image is formed on an image sensor; and
a frequency changing unit configured to increase the predetermined frequency when the detected image magnification is larger than an image magnification threshold.

10. An image stabilization control apparatus according to claim 2, further functioning as:
an image magnification detecting unit configured to detect, from an image capturing state of the optical apparatus, an image magnification at which an object image is formed on an image sensor; and
a frequency changing unit configured to increase the predetermined frequency when the detected image magnification is larger than an image magnification threshold.

11. An image stabilization control apparatus according to claim 3, wherein, when the first shake signal indicates a shake of the optical apparatus larger than a predetermined value, the predicting unit temporarily stops the adaptive process, and the predicted signal produced during the stoppage of the adaptive process is used as the motion vector detection signal.

12. An optical apparatus comprising:
an image stabilization control apparatus configured to perform an image stabilization control to reduce image blur due to shaking of the optical apparatus by using a shake detection signal obtained through detection of the shaking of the optical apparatus and a motion vector detection signal indicating a motion vector detected in an image signal produced through image capturing using the optical apparatus; and
an optical image stabilizing element configured to be driven by the image stabilization control,
wherein the image stabilization control apparatus comprises:
a shake extracting unit configured to extract a first shake signal from the shake detection signal, the first shake signal being a frequency component whose frequency is higher than a predetermined frequency;
one or more processors; and
a memory storing instructions which, when executed by the one or more processors, cause the image stabilization control apparatus to function as:
a predicting unit configured to produce, by using the motion vector detection signal, a predicted shake signal indicating a predicted value of the shaking;
a combining unit configured to combine the first shake signal with the predicted shake signal to produce a second shake signal;
a controlling unit configured to perform the image stabilization control by using the second shake signal; and
a motion vector extracting unit configured to extract a specific motion vector signal from the motion vector detection signal, the specific motion vector signal being a frequency component whose frequency is lower than the predetermined frequency,
wherein:
the controlling unit is configured to perform the image stabilization control by using the second shake signal in still image capturing, and
the predicting unit is configured to produce the predicted shake signal by using the specific motion vector signal.

13. An optical apparatus comprising:
an image stabilization control apparatus configured to perform an image stabilization control to reduce image blur due to shaking of an optical apparatus by using a shake detection signal obtained through detection of the shaking of the optical apparatus and a motion vector detection signal indicating a motion vector detected in an image signal produced through image capturing using the optical apparatus and an image sensor; and
an optical image stabilizing element configured to be driven by the image stabilization control,
wherein the image stabilization control apparatus comprises:
a shake extracting unit configured to extract a first shake signal from the shake detection signal, the first shake signal being a frequency component whose frequency is higher than a predetermined frequency;
one or more processors; and
a memory storing instructions which, when executed by the one or more processors, cause the image stabilization control apparatus to function as:
a predicting unit configured to produce, by using the motion vector detection signal, a predicted shake signal indicating a predicted value of the shaking;
a combining unit configured to combine the first shake signal with the predicted shake signal to produce a second shake signal;
a controlling unit configured to perform the image stabilization control by using the second shake signal; and
a frequency changing unit configured to change the predetermined frequency depending on at least one of an elapsed exposure time of the image sensor from start of its exposure in the image capturing and a predetermined exposure time of the image sensor determined before the image capturing.

14. A non-transitory computer-readable storage medium storing an image stabilizing control program as a computer program to cause a computer to perform an image stabilization control process to reduce image blur due to shaking of an optical apparatus by using a shake detection signal obtained through detection of the shaking of the optical apparatus and a motion vector detection signal indicating a motion vector detected in an image signal produced through image capturing using the optical apparatus, the image stabilizing control program causing the computer to:
extract a first shake signal from the shake detection signal, the first shake signal being a frequency component whose frequency is higher than a predetermined frequency;
produce, by using the motion vector detection signal, a predicted shake signal indicating a predicted value of the shaking;
combine the first shake signal with the predicted shake signal to produce a second shake signal;
perform the image stabilization control by using the second shake signal; and
extract a specific motion vector signal from the motion vector detection signal, the specific motion vector signal being a frequency component whose frequency is lower than the predetermined frequency,
wherein:
the program causes the computer to perform the image stabilization control process by using the second shake signal in still image capturing and to produce the predicted shake signal by using the specific motion vector signal.

15. A non-transitory computer-readable storage medium storing an image stabilizing control program as a computer program to cause a computer to perform an image stabilization control process to reduce image blur due to shaking of an optical apparatus by using a shake detection signal obtained through detection of the shaking of the optical apparatus and a motion vector detection signal indicating a motion vector detected in an image signal produced through image capturing using the optical apparatus and an image sensor, the image stabilizing control program causing the computer to:
extract a first shake signal from the shake detection signal, the first shake signal being a frequency component whose frequency is higher than a predetermined frequency;
produce, by using the motion vector detection signal, a predicted shake signal indicating a predicted value of the shaking;
combine the first shake signal with the predicted shake signal to produce a second shake signal;
perform the image stabilization control by using the second shake signal; and
change the predetermined frequency depending on at least one of an elapsed exposure time of the image sensor from start of its exposure in the image capturing and a predetermined exposure time of the image sensor determined before the image capturing.

* * * * *